(12) United States Patent
Hamann et al.

(10) Patent No.: US 12,436,242 B2
(45) Date of Patent: Oct. 7, 2025

(54) HIGH CONTRAST MEMS PHASED-ARRAY

(71) Applicant: SILICON LIGHT MACHINES CORPORATION, San Jose, CA (US)

(72) Inventors: Stephen Hamann, Mountain View, CA (US); Olav Solgaard, Stanford, CA (US)

(73) Assignee: SILICON LIGHT MACHINES CORPORATION, San Jose, CA (US)

( * ) Notice: Subject to any disclaimer, the term of this patent is extended or adjusted under 35 U.S.C. 154(b) by 911 days.

(21) Appl. No.: 17/670,274

(22) Filed: Feb. 11, 2022

(65) Prior Publication Data

US 2022/0260687 A1     Aug. 18, 2022

Related U.S. Application Data

(60) Provisional application No. 63/149,084, filed on Feb. 12, 2021.

(51) Int. Cl.

| | |
|---|---|
| *G01S 7/48* | (2006.01) |
| *G01S 7/481* | (2006.01) |
| *G02B 27/09* | (2006.01) |
| *G02F 1/29* | (2006.01) |
| *G06T 7/80* | (2017.01) |

(52) U.S. Cl.
CPC .......... *G01S 7/4817* (2013.01); *G01S 7/4815* (2013.01); *G02B 27/0916* (2013.01); *G02B 27/0927* (2013.01); *G02F 1/292* (2013.01); *G06T 7/80* (2017.01)

(58) Field of Classification Search
None
See application file for complete search history.

(56) References Cited

U.S. PATENT DOCUMENTS

| | | | |
|---|---|---|---|
| 5,459,610 A | 10/1995 | Bloom et al. | |
| 6,144,481 A | 11/2000 | Kowarz et al. | |
| 10,746,983 B2 | 8/2020 | Payne et al. | |
| 11,016,197 B1 * | 5/2021 | Barber | G01S 17/931 |
| 2003/0095318 A1 | 5/2003 | DiCarlo et al. | |
| 2018/0306925 A1 | 10/2018 | Hosseini et al. | |
| 2019/0004151 A1 | 1/2019 | Abediasl et al. | |
| 2021/0072531 A1 | 3/2021 | Ashida et al. | |

* cited by examiner

*Primary Examiner* — Hovhannes Baghdasaryan
(74) *Attorney, Agent, or Firm* — William Nuttle

(57) ABSTRACT

Optical systems including Microelectromechanical System devices (MEMS) phased-arrays and methods for operating the same to improve contrast are provided. Generally, the system includes a light source, illumination optics, and MEMS phased-arrays operable to receive a light-beam from the illumination optics and to project light onto a far-field scene and to steer an area of illumination over the far-field scene by modulating phases of at least some light of the light-beam received from the illumination optics. The illumination optics are operable to illuminate the MEMS-phased arrays with a light-beam having a Gaussian-profile to minimize side-lobes with respect to a main-lobe in an emission profile of light reflected from the far field scene in response to the projected light. In some embodiments the system is or is included in a Light Detection and Ranging system.

20 Claims, 19 Drawing Sheets

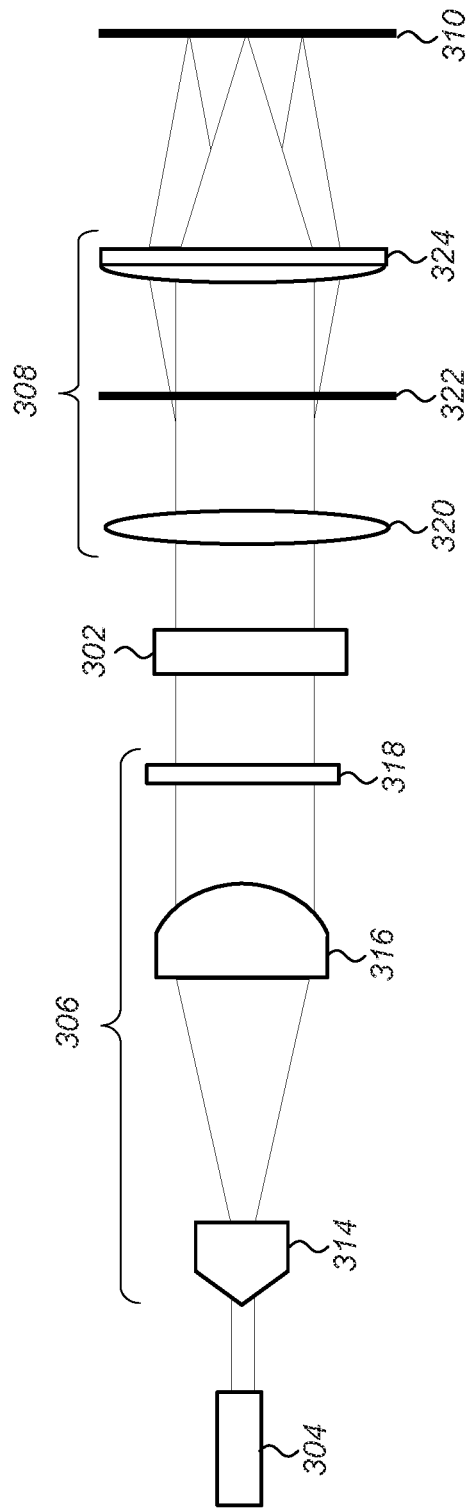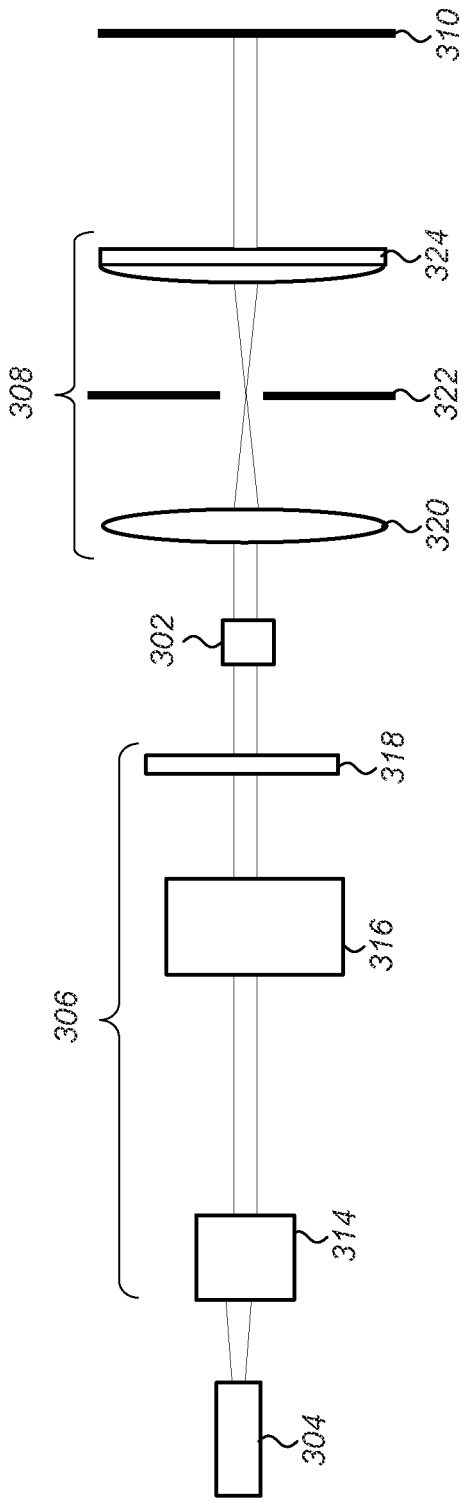
FIG. 3A
FIG. 3B

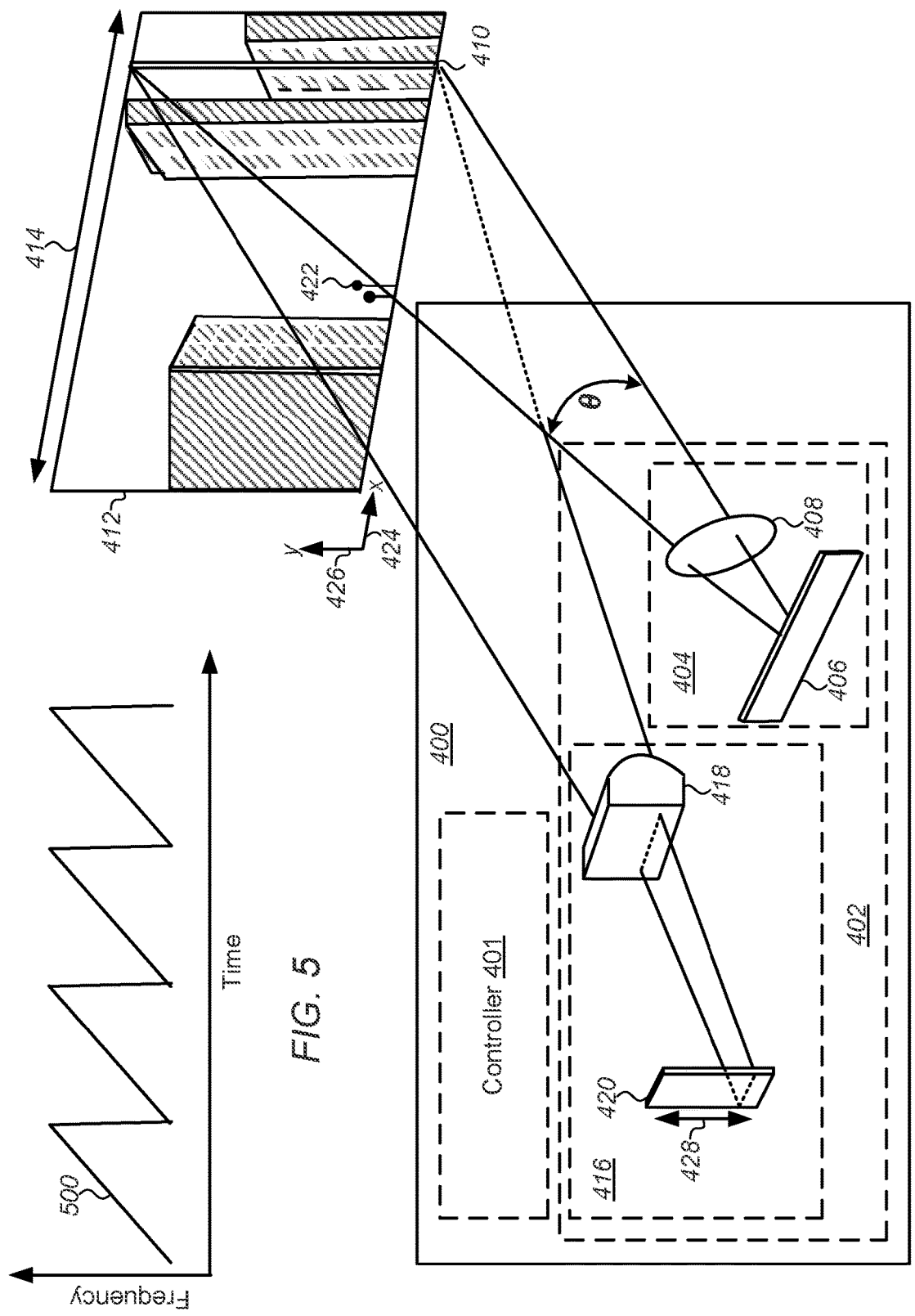

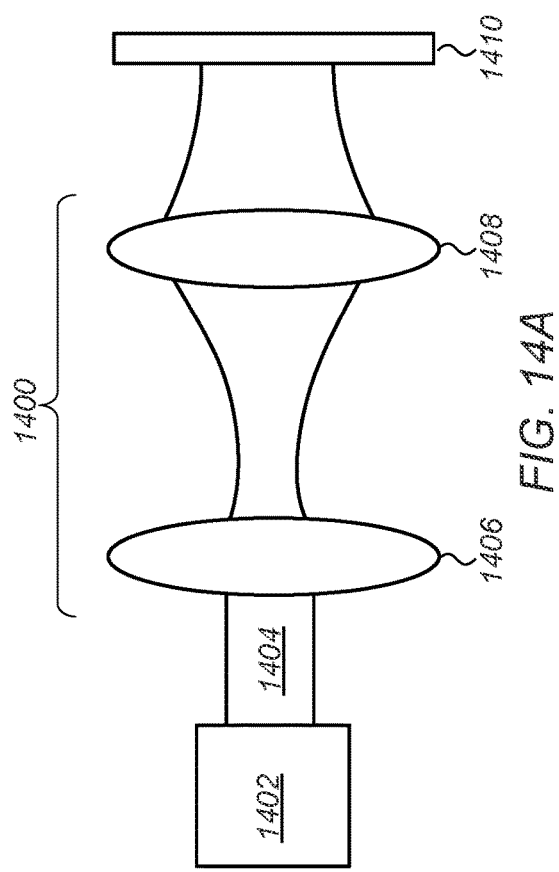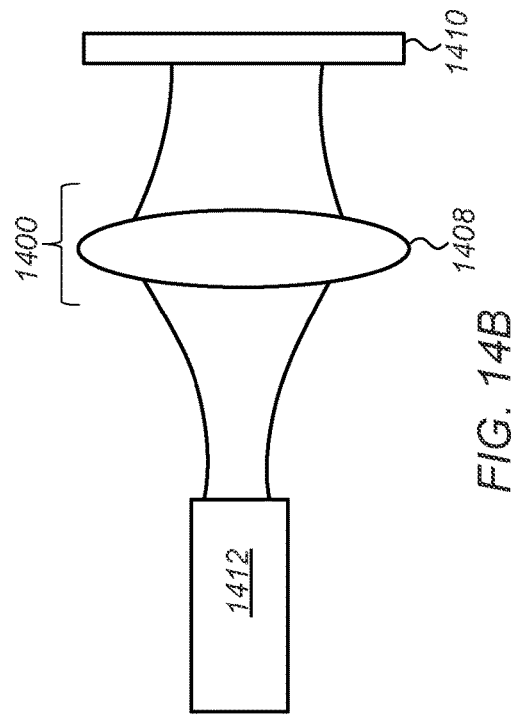

HIGH CONTRAST MEMS PHASED-ARRAY

CROSS-REFERENCE TO RELATED APPLICATIONS

This application claims the benefit of priority under 35 U.S.C. 119(e) to U.S. Provisional Patent Application Ser. No. 63/149,084, filed Feb. 12, 2021, which is incorporated by reference herein in its entirety.

TECHNICAL FIELD

This disclosure generally relates to optical systems including Microelectromechanical System devices (MEMS) phased-arrays, and more particularly to systems and methods for operating the same to minimize side-lobes in an emission profile of light reflected from the far field scene in response to light projected from the MEMS phased-array.

BACKGROUND

Light Detection and Ranging (LIDAR) systems are widely used in a number of different applications including automotive, robotics, and unmanned or autonomous vehicles for mapping, object detection and identification, and navigation. Generally, LIDAR systems work by illuminating a target in a far field scene with a light-beam from a coherent light source, typically a laser, and detecting the reflected light with a sensor. Differences in light return times and wavelengths are analyzed in the LiDAR system to measure a distance to the target, and, in some applications, to render a digital 3-D representation of the target.

Traditional LiDAR systems used a mechanical scanner, such as a spinning or moving mirror, to steer the light-beam over the target. However, these mechanical LIDAR systems are rather bulky and relatively expensive pieces of equipment making them unsuitable for use in many applications.

A more recent technology is solid-state LiDAR systems in which the scanner is replaced by MEMS-based spatial light modulators used to form a MEMS phased-array built entirely on a single substrate or chip. Solid-state LiDAR systems have the potential to provide cheaper, more compact systems, with higher resolution than traditional LiDAR systems. Although capable at least in theory of providing much faster beam steering than a traditional mechanical LiDAR system, achieving large scan angles, needed for larger field of view (FOV) and resolution, requires small dimensions for the MEMS mirror and elements, approaching wavelengths of the light typically used in LiDAR systems. This in turn adds to the cost and complexity of the MEMS phased-array, and makes it difficult to maintain the speed advantage of the DMD-based MEMS phased-array over the mechanical scanner of traditional LiDAR systems.

Another shortcoming of MEMS phased-array is the generation of unwanted side-lobes in addition to a main-lobe in an emission profile of light reflected from the far field scene in response to light projected from the MEMS phased-array. These side-lobes can be problematic for a number of reasons, and it is therefore desirable to develop new OPA architectures which suppress or eliminate the side-lobes Accordingly, there is a need for an optical system including MEMS phased-array and methods for operating the same to suppress or eliminate the side-lobes in an emission profile of light reflected from the far field scene, thereby providing high contrast in LiDAR applications.

SUMMARY

An optical system including a micro-electromechanical system (MEMS) phased-array suitable for use in a high contrast Light Detection and Ranging (LIDAR) system, and methods of operating the same are provided.

Generally, the optical system includes a light source, illumination optics operable to receive light from the light source, and a number of microelectromechanical system (MEMS) phased-arrays to receive a light-beam from the illumination optics. The MEMS phased-arrays are operable to modulate and reflect the received light-beam to project light onto a far-field scene to illuminate an area therein, and to steer the area of illumination over the far-field scene by modulating phases of at least some light of the light-beam received from the illumination optics. In one embodiment, the illumination optics is operable to illuminate the number of the MEMS phased-arrays with a light-beam having a Gaussian-profile to minimize side-lobes with respect to a main-lobe in an emission profile of light within a defined field of view (FOV) reflected from the far-field scene in response to the projected light.

In another embodiment, each of the MEMS phased-arrays is a ribbon MEMS phased-array including a plurality of ribbons suspended in parallel rows over a substrate, each ribbon having a light reflective surface and a length perpendicular to a long axis of the ribbon MEMS phased-array, and the ribbon MEMS phased-array is operable to deflect at least a number of the plurality of ribbons towards the substrate to modulate phases of light reflected therefrom to scan the far field scene in an angular dimension and an axial dimension parallel to the long axis of the phased-array. The plurality of ribbons are ganged together into a plurality of blaze groupings, and the MEMS phased-array is operable so that deflection of a number of the plurality of ribbons in at least one of the plurality of blaze groupings is offset from a blaze pattern of the blaze grouping to compensate for wavefront errors in the light-beam to minimize or further minimize side-lobes.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIGS. 3A and 3B are optic diagrams illustrating illumination and imaging light paths for an optical system including MEMS phased-array;

FIG. 4 is a schematic diagram of a Light Detection and Ranging (LIDAR) system including an optical system with a MEMS phased-array;

FIG. 5 is a diagram illustrating a change in frequency of an outgoing pulse over time for a LiDAR system using a frequency modulated continuous wave (FMCW) technique;

FIGS. 14A and 14B are optic diagrams illustrating illumination optics and light paths for illuminating a MEMS phased-array with a light-beam having a Gaussian-profile;

DETAILED DESCRIPTION

Embodiments of a high contrast Microelectromechanical System devices (MEMS) phased-array and optical systems, such as Light Detection and Ranging (LIDAR) systems, and methods for operating the same are described. In the following description, numerous specific details are set forth, such as specific materials, dimensions and processes parameters etc. to provide a thorough understanding of the present invention. However, particular embodiments may be practiced without one or more of these specific details, or in combination with other known methods, materials, and apparatuses. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Figure 1:
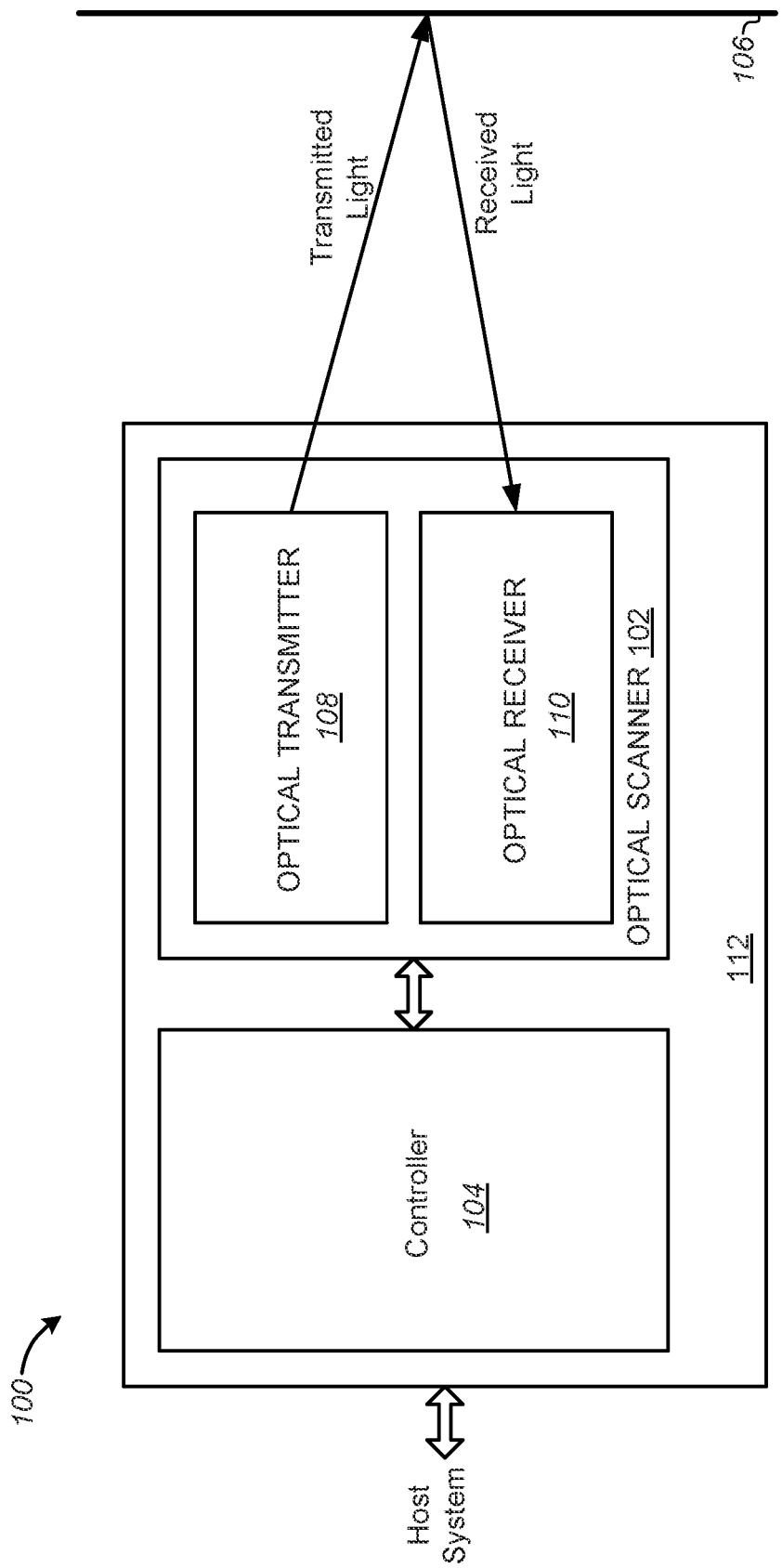
FIG. 1 is a block diagram illustrating an embodiment of an optical system including an optical transmitter with a microelectromechanical system device (MEMS) phased-array.

FIG. 1 is a block diagram illustrating an embodiment of a LiDAR system 100 including a solid state optical scanning system or optical scanner 102 according to the present disclosure. Referring to FIG. 1 the LiDAR system 100 generally includes a microcontroller or controller 104 to control operation of other components of the LiDAR system, including the optical scanner 102, and to interface with a host system (not shown). The controller 104 includes a processor and data processing circuitry to analyze signals from the optical scanner 102 to detect and measure a location of objects in a far field scene 106, estimate a time of flight (TOF) of distance between the objects and the LiDAR system 100 or host, and, by repeating the preceding measurements over time, detect and measure a velocity and direction of moving objects in the far field scene. Generally, the controller 104 further includes additional circuits and memory to measure a size of and identify discrete objects, such as cars or pedestrians, sensed in the far field scene 106. Optionally, the controller 104 can further include memory and circuits to create a three dimensional (3D) model of the far field scene 106.

The optical scanner 102 includes an optical transmitter 108 to generate, transmit and scan a light over the far field scene 106 in at least two dimensions, and an optical receiver 110 to receive reflected light from the far field scene. Generally, both the optical transmitter 108 and the optical receiver 110 are both solid state. By solid state it is meant both a light scanning element of the optical transmitter 108 and a light collecting element of the optical receiver 110 are made or fabricated on silicon, semiconductor or other type of substrate using microelectromechanical system devices (MEMs) and semiconductor or integrated circuit (IC) fabrication techniques. In particular, a beam steering or light scanning element of the optical scanner 102 is made using a number of MEMS phased-arrays in place of the mechanical scanner, such as a spinning or moving mirror used in a conventional LiDAR system. In some embodiments, such as that shown in FIG. 1, substantially an entire LiDAR system including the optical scanner 102, controller 104, along with any interfaces (not shown in this figure) to a host system are integrally formed on a single integrated circuit (IC 112). Because the optical scanner 102 does not include the moving or rotating elements of conventional LiDAR systems the resulting optical scanner and LiDAR system is more resilient to vibrations, and can be much smaller and cheaper.

Figure 2B:
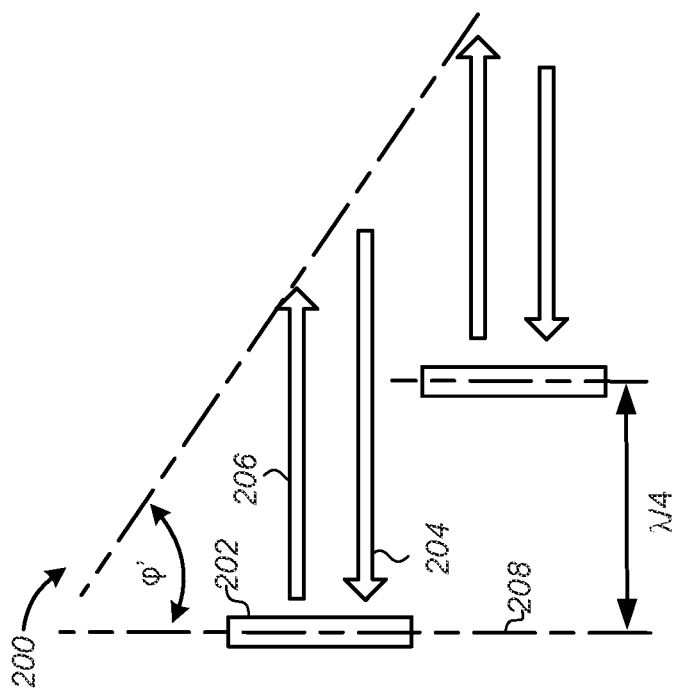
FIGS. 2A through 2C are schematic diagrams illustrating a method by which a MEMS phased-array can be operated to steer a spot or swath of light.
Figure 2C:
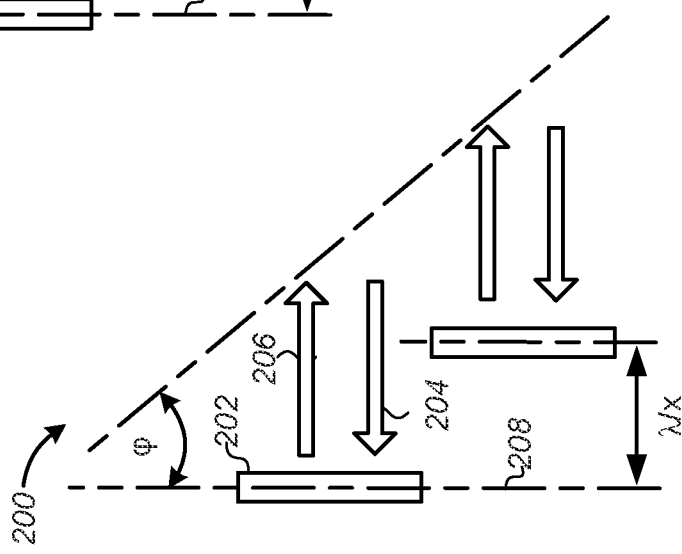
Figure 2A:
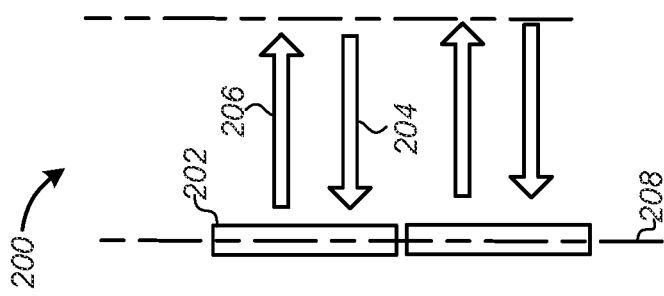

The manner or method in which an optical MEMS-based phased-array can be operated to implement beam steering or scanning will now be described with reference to FIGS. 2A through 2C. Generally, an optical MEMS-based phased-array (hereinafter MEMS phased-array) uses a row of modulators that can change the direction of a coherent light-beam by adjusting the relative phase of the signal from one element to the next. FIGS. 2A through 2C show schematically two adjacent light reflective elements 202 or pixels which form a MEMS phased-array 200. Although only two pixels or light reflective elements 202 are shown, it will be understood that a MEMS phased-array used in LiDAR applications would typically include from several hundred to several thousand light reflective elements. In particular, FIGS. 2A and 2B represent the extremes of an angular scan (i.e. from 0 degrees or back reflection perpendicular to a long axis 208 of the MEMS phased-array 200, to a $\pm 1^{st}$ order). As shown in these figures a maximum phase slope possible between adjacent pixels or light reflective elements 202 is $1\pi$ or quarter wavelength ($\lambda/4$) deflection. FIG. 2C illustrates a configuration in which the deflection between adjacent pixels or light reflective elements 202 is $\lambda/x$, where x is a whole number larger than four (4), to steer the light to intermediate angles between 2A and 2B.

Referring to FIG. 2A the MEMS phased-array 200 is illuminated with a line of coherent incident light 204, and individually addressing or deflecting the light reflective elements 202 from quiescent or non-deflected state by different amounts a relative to a wavelength ($\lambda$) of incident light 204 a wave front 206 reflected from the MEMS phased-array 200 can be made to propagate away from the MEMS phased-array at angle ($\varphi$) relative to a long axis 208 of the MEMS phased-array. FIG. 2A illustrates the light reflective elements 202 in the quiescent or non-deflected state in which the reflected light propagated or steered in a direction parallel to the axis 208 of the MEMS phased-array. FIG. 2C illustrates the light reflective elements 202 in state in which the light reflective elements 202 have been deflected by an amount equal to 0.25 times the wavelength ($\lambda$) of incident light 204 and causing the reflected light to be steered or propagated away at a first angle ($\varphi'$) relative to the axis 208 of the MEMS phased-array. FIG. 2B illustrates the light reflective elements 202 in state in which the light reflective elements 202 have been deflected by an amount equal to x<0.25 times the wavelength ($\lambda$) of incident light 204 and causing the reflected light to be steered or propagated away at a second angle ($\varphi$) relative to the axis 208 of the MEMS phased-array.

It is noted that 0.25 times the wavelength ($\lambda$) of incident light 204 is the maximum by which adjacent light reflective elements 202 can be deflected without introducing phase ambiguity and results in a binary pattern creating a positive and negative first order beam. Thus, twice $\varphi'$ represents a maximum angular field of view (FOV) over which a line or swath of modulated light can steered or scanned is determined by angle between $1^{st}$ order reflected light. The actual values for these angles for $1^{st}$ order reflected light is dependent on a width or pitch between the light reflective elements 202 and the wavelength ($\lambda$) of the incident light 204 but is generally given by the equation:

$$FOV = 2\sin^{-1}\frac{\lambda}{d} \qquad \text{(Eq. 1)}$$

where $\lambda$ is the wavelength of the incident light and d is two widths of the light reflective elements 202.

FIGS. 3A and 3B are optic diagrams illustrating illumination and imaging light paths for an optical system including MEMS phased-array. In particular, FIG. 3A is a top view illustrating the light paths along a vertical or longitudinal axis of the MEMS phased-array, and FIG. 3B is a side view of the light paths. For purposes of clarity and to simplify the drawings the optical light path is shown as being unfolded causing the MEMS phased-array 302 to appear as transmissive. However, it will be understood that because the MEMS phased-array 302 is reflective the actual light paths are folded at an acute angle relative to one another and the MEMS phased-array.

Referring to FIGS. 3A and 3B, the light path begins at a light source 304, such as a laser, and passes through illumination optics 306, to illuminate a substantially linear portion of a linear array of the MEMS phased-array 302, and imaging optics 308 to focus the modulated light onto objects or surfaces in a far-field scene 310. In conventional optical systems the illumination optics 306 can include a Powell lens 314, a long axis collimating lens 316, and a cylindrical, short axis focusing lens 318 to substantially uniformly illuminate a rectangular portion of the MEMS phased-array 302 with a light-beam. The imaging optics 308 generally includes a number of lenses and optical elements to direct modulated or phase shifted light reflected from the MEMS phased-array 302 onto objects or surfaces in a far-field scene 310. In one embodiment, such as that shown, the imaging optics 308 includes a first Fourier Transform (FT) lens 320, a spatial filter, such as a Fourier aperture 322, to separate a $0^{th}$ order beam in the modulated light from $\pm 1^{st}$ order beams and a second inverse Fourier Transform (FT) lens 324.

A method of operating a LiDAR system including a MEMS phased-array to scan a far field scene will now be described with reference to FIG. 4. FIG. 4 is a schematic functional diagram of a portion of a LiDAR system 400 including controller 401 and a solid state optical scanner 402 having an optical transmitter 404 with at least one MEMS phased-array 406 configured to receive light from a light source through shaping or illumination optics (not shown in this figure), and to modulate phases of at least some of the received light and transmit or project a beam of phase modulated light through projection optics 408 to steer a line or swath 410 of illumination to scan a far field scene 412. The MEMS phased-array 406 steers the beam of light to scan the far field scene 412 by changing phase modulation of light incident on different portions of the MEMS phased-array. Generally, the first MEMS phased-array 406 is configured to scan the far field scene 412 in at least two-dimensions (2D), including an angular dimension ($\theta$), and an axial dimension (indicated by arrow 414) parallel to a long axis of the MEMS phased-array.

It is noted that although the optical scanner 404 is shown schematically as including a single MEMS phased-array 406 this need not and generally is not the case in every embodiment. Rather, as explained in detail below, it is often advantageous that the optical scanner 404 include multiple adjacent MEMS phased-arrays 406 operated in unison or a single MEMS phased-array having multiple adjacent arrays to increase either aperture width or length to increase a power or radiant flux of the transmitted or received light and to increase the point spread resolution of the system.

The optical scanner 404 further includes an optical receiver 416 including collection or receiving optics 418 to capture light from the far field scene 412, which is then directed onto a detector 420.

Referring to FIG. 4, depth or distance information from the LiDAR system 400 to a target or object 422 in the far field scene 412 can be obtained using any one of a number of standard LiDAR techniques, including pulsed, amplitude-modulated-continuous-wave (AMCW) or frequency-modulated-continuous-wave (FMCW). In pulsed and AMCW LiDAR systems the amplitude of intensity of the light transmitted is either pulsed or modulated with a signal, and the TOF from the LiDAR system 400 to the object 422 is obtained by measuring the amount by which the return signal is time-delayed. The distance to the reflected object is found by multiplying half this time by the speed of light.

FIG. 5 is a diagram illustrating a change in frequency of an outgoing pulse of transmitted light over time for a LiDAR system using an FMCW technique. Referring to FIGS. 4 and 5, in a FMCW LiDAR the frequency of an outgoing chirp or pulse 500 of transmitted light is continuously varied over time as the swath 410 of light is continuously scanned across the far field scene 412. The time to the object 422 can be determined by comparing the frequency of light reflected from the object to that of a local oscillator, and the distance to the object is found by using the speed of light as previously described. FMCW LiDAR systems have an advantage over amplitude modulated in that the local oscillator provides an inherent amplification of the detected signal.

With information on TOF the controller 401 in the LiDAR system can then calculate a location of the object 422 in the far field scene 412 along an X-axis 424 from the steering direction of the MEMS phased-array 406 when the light was transmitted from the MEMS phased-array, and along a Y-axis 426 from a sensed location of the object along an axis of the detector 420 (indicated by arrow 428) parallel to a long axis of the detector.

Embodiments of optical scanners according to the present disclosure, and which are particularly suitable for use in LiDAR systems to scan and/or identify objects or targets, such as people, buildings and automobiles, in a far field scene will now be described with reference to the block diagrams of FIGS. 6A to 6C.

Figure 6A:
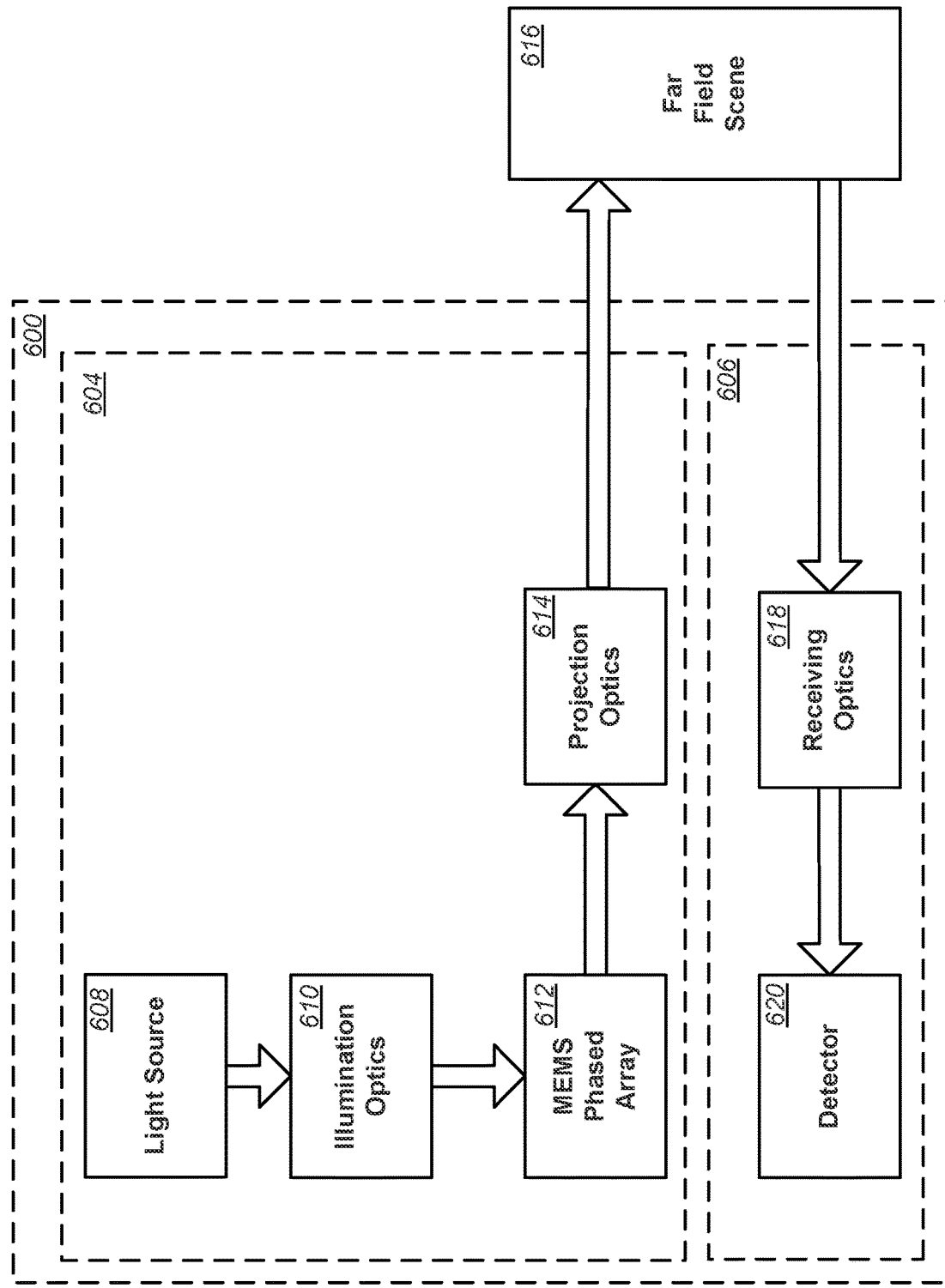
FIG. 6A is a block diagram illustrating an embodiment of an optical system including a MEMS phased-array in an optical transmitter of an optical scanner suitable for use in a LiDAR system.

Referring to FIG. 6A, in a first embodiment the optical scanner 600 includes an optical transmitter 604 and an optical receiver 606. The optical transmitter 604 generally includes a light source 608, shaping or illumination optics 610 to illuminate a MEMS phased-array 612 with light from the light source, and imaging or projection optics 614 to transmit or project phase modulated light from the MEMS phased-array into a far field scene 616 to scan the far field scene in at least two dimensions.

The light source 608 can include any type and number of light emitting devices capable of continuously emitting or pulsing a coherent light at a sufficient power level or power density, and at a single wavelength or frequency, or within a narrow range of wavelengths or frequencies, to enable light from the MEMS phased-array 612 to be modulated in phase and/or amplitude. Generally, the light source 608 is a continuous-wave light source that continuously emits a light that is modulated either in amplitude, for an AMCW LiDAR, or in frequency, for a FMCW LiDAR. Because objects in the far field scene are continuously illuminated; the light source can operate with less power compared to a high peak-power of pulsed systems. The light source 608 can include a number of lasers or laser emitters, such as diode lasers, vertical-cavity surface-emitting lasers (VCSELS). In one embodiment the light source 608 includes a VCSEL array having a number of laser emitters to increase optical power while meeting or extending an eye-safe power limit. In another embodiment, the light source 608 includes a number of high-power lasers producing from about 5000 to about 40,000 milliwatts (mW) of power at a wavelength ($\lambda$) of from about 750 to about <2000 nm.

The illumination optics 610 can comprise a number of elements including lens integrators, mirrors and prisms, configured to transfer light from the light source 608 to the first MEMS phased-array 612 to illuminate a line of a specified width and covering substantially a full width and/or length of the MEMS phased-array. In one embodiment, the illumination optics 610 includes a microlens or lenticular array (described in greater detail below) to individually illuminate one or more modulators in the first MEMS phased-array 612.

The projection optics 614 can also include lenses, integrators, mirrors and prisms, and are configured to transfer light from the MEMS phased-array 612 to illuminate a line or swath in the far field scene 616. Generally, the projection optics 614 includes magnifying optics or elements, such as Fourier Transform (FT) lenses and mirrors, to increase a field of view (FOV) of the optical scanner 600. In one embodiment, the projection optics 614 include a lenticular array to disperse the light in a first direction to form the swath of illumination perpendicular to a direction over which the projected light is moved or steered in the far field scene 616.

The optical receiver 606 generally includes receiving optics 618 to collect or receive light from the far field scene and direct or pass the received light onto a detector 620 or detector array. Like the illumination and projection optics the receiving optics 618 can include lenses, integrators, mirrors and prisms, and are configured to receive and transfer light from the far field scene 616 to the onto the detector 620. In one embodiment, the receiving optics 618 includes a lenticular array to increase an effective fill factor of the detector 620.

Generally, the detector 620 can comprise any type of detector sensitive to light in the wavelengths generated by the light source 608, including a rolling shutter camera or cameras, a one or two dimensional array of photodiode detectors, or a single photon avalanche diode (SPAD) array. In the embodiment shown in FIG. 6A, the receiving optics will be 2D, and the detector is a 2D array of detectors or a 2D detector array. LiDAR systems used in automobiles detector 620 can use lower density, higher sensitivity devices, such as APDs, for long range detection.

Figure 6B:
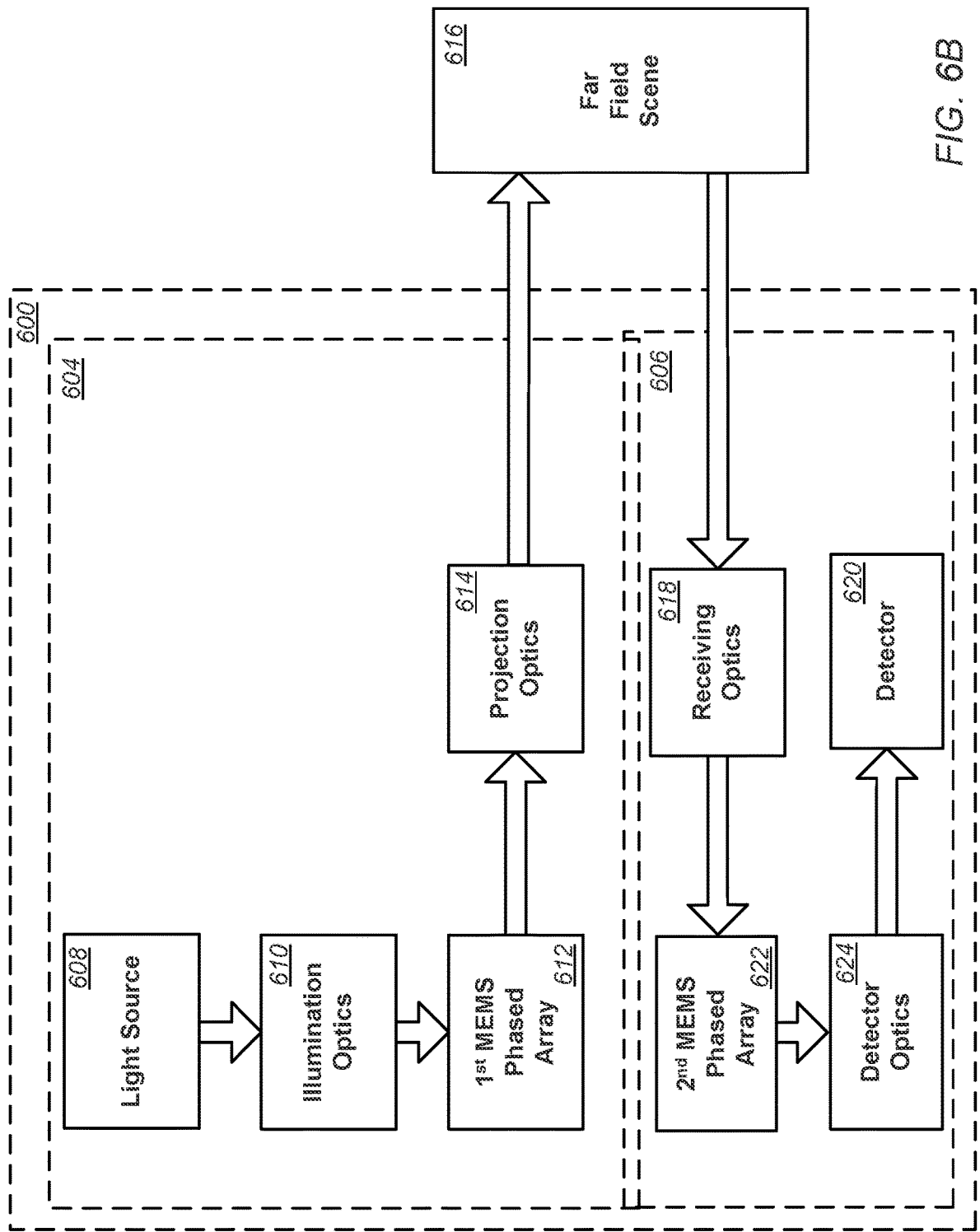
FIG. 6B is a block diagram illustrating another embodiment of the optical system of FIG. 6A including a $1^{st}$ MEMS phased-array in an optical transmitter and a $2^{nd}$ MEMS phased-array in an optical receiver of the optical scanner.

In another embodiment, shown in FIG. 6B, the optical receiver 606 is a pointing optical receiver including a $2^{nd}$ MEMS phased-array 622 to de-scan collected or received light by selectively directing light reflected from a slice of the far field scene 616 onto the detector 620 while substantially rejecting background light. For example, the $2^{nd}$ MEMS phased-array directs the light from the light source reflected from the far field scene 616 onto the detector 620 by adapting the direction to which it steers light based on information on the direction to which the $1^{st}$ MEMS phased-array 612 steers the light-beam. Optionally, as in the embodiment shown the optical receiver 606 can further include detector optics 624 to transfer light from the $2^{nd}$ MEMS phased-array 622 on to the detector 620. As with the illumination optics 610, projection optics 614 and receiving optics 618, the detector optics 624 can include lenses, integrators, mirrors and prisms, and configured to substantially fill or over fill the detector 620. In one embodiment, the receiving optics 618 includes a lenticular array to increase an effective fill factor of a stacked phased-array 622.

In some embodiments in which the wherein the detector 620 includes a one dimensional (1D) detector array, and the optical receiver 606 is a pointing-receiver in which the $2^{nd}$ MEMS phased-array 622 selectively directs light reflected from a slice of far field scene 616 onto the 1D detector array while rejecting light reflected from the far field scene outside of the slice and background light.

As with the embodiment shown in FIG. 6A the optical scanner 600 includes an optical transmitter 604 and an optical receiver 606. The optical transmitter 604 additionally includes the light source 608 and illumination optics 610 to illuminate the $1^{st}$ MEMS phased-array 612 with light from the light source and projection optics 614 to transmit or project phase modulated light from the MEMS phased-array into the far field scene 616. The optical receiver 606 includes in addition to the $2^{nd}$ MEMS phased-array 622 the detector 620 and receiving optics 618 to collect or receive light from the far field scene 616 and to direct or pass the light to the $2^{nd}$ MEMS phased-array 622 and onto the detector 620. As the $2^{nd}$ MEMS phased-array 622 directs the light from the light source reflected from the far field scene onto the detector 620, it is possible to reduce the size or width of the detector 620, compared to the case in which the $2^{nd}$ MEMS phased-array 622 is not provided. That is, because $2^{nd}$ MEMS phased-array 622 is capable of imaging a slice of the 2D scene 616 onto the detector 620, the detector can include a 1D array detector. The full scene is reconstructed by scanning the $2^{nd}$ MEMS phased-array.

Figure 6C:
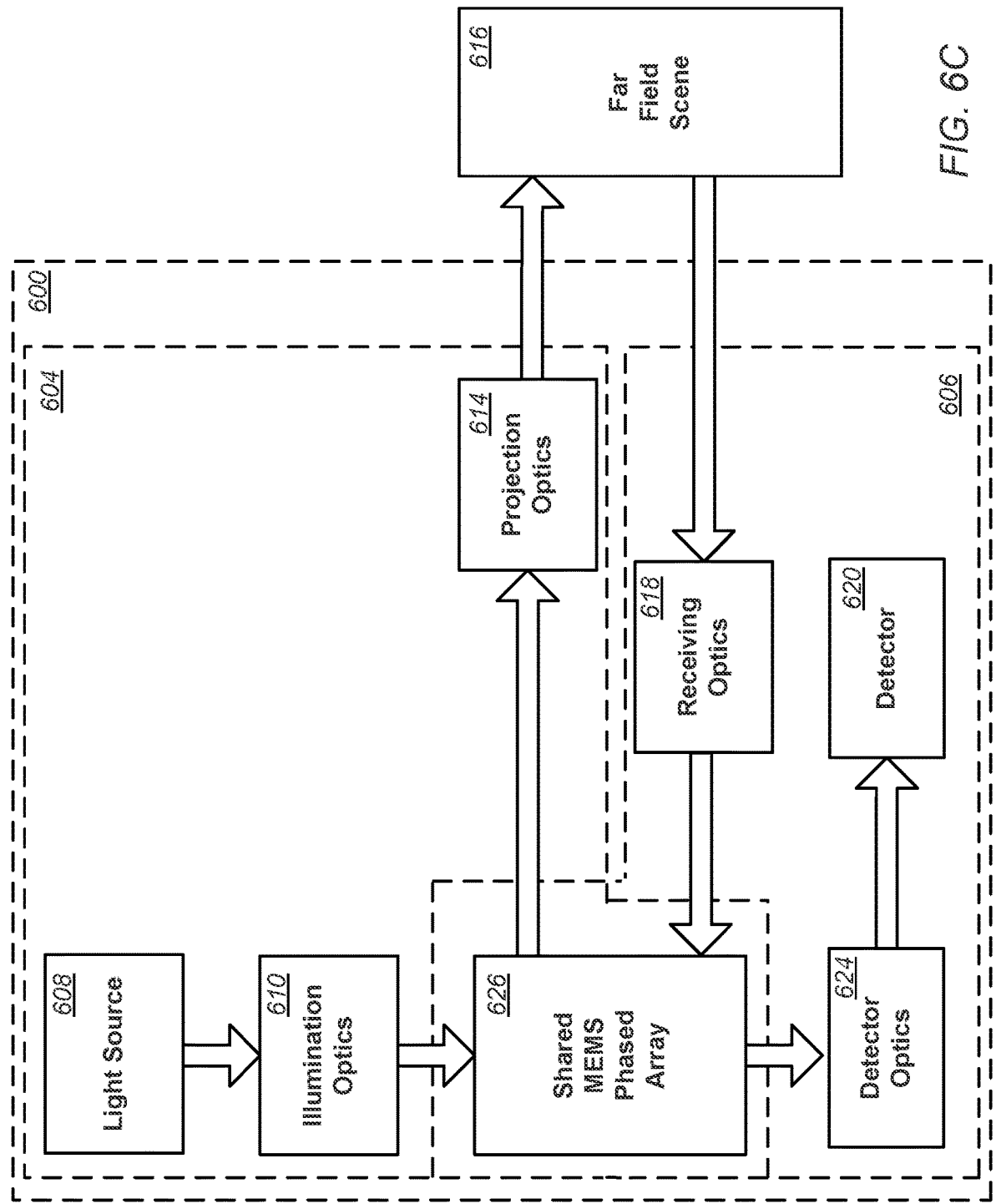
FIG. 6C is a block diagram illustrating yet another embodiment of the optical system of FIG. 6A including a shared MEMS phased-array in both the transmitting and receiving light paths.

In yet another embodiment, shown in FIG. 6C, the optical scanner 600 includes a shared MEMS phased-array 626 configured to modulate phases of the light from a light source 608 at a first time to scan a far field scene 616, and at a second time to de-scan collected or received light by directing light from the light source reflected from the far field scene onto a detector 620 while substantially rejecting background light. As with the embodiments shown in FIGS. 6A and 6B, the optical scanner 600 includes an optical transmitter 604 and an optical receiver 606. The optical transmitter 604 includes in addition to the light source 608 and shared MEMS phased-array 626, illumination optics 610 to illuminate the MEMS phased-array with light from the light source and projection optics 614 to transmit or project phase modulated light from the MEMS phased-array into the far field scene 616. The optical receiver 606 includes in addition to the detector 620 and shared MEMS phased-array 626, receiving optics 618 to collect or receive light from the far field scene 616 and, optionally, detector optics 624 to direct or pass the light to the shared MEMS phased-array and onto the detector 620.

Embodiments of a MEMS-based spatial light modulator (SLM) to form a MEMS phased-array suitable for use in an optical scanner will now be described.

One type of MEMS phased-array suitable for use in a LIDAR system to modulate or steer a beam of light is a ribbon-type MEMS phased-array including multiple electrostatically deflectable ribbons, such as a Grating Light Valve (GLV™), commercially available from Silicon Light Machines, in Sunnyvale CA Ribbon-type MEMS phased-arrays generally include a one dimensional (1D) linear array composed of thousands of free-standing, addressable electrostatically actuated movable structures, such as elongated elements or ribbons, each having a light reflective surface supported over a surface of a substrate. Each of the ribbons includes an electrode and is deflectable through a gap or cavity toward the substrate by electrostatic forces generated when a voltage is applied between the electrode in the ribbon and a base electrode formed in or on the substrate. The ribbon electrodes are driven by a drive channel in a driver, which may be integrally formed on the same substrate with the array. Ribbon-type MEMS phased-arrays are suited for LiDAR systems because they are small, fast, low cost systems, which are simple to fabricate, integrate and package while still capable of providing large diffraction angles. Additionally, ribbon-type MEMS phased-arrays are capable of working to produce 3D scans or models when used in combination with rolling shutter cameras, photodiode detector array and SPAD array, and a wide range of illumination sources, including a laser array or bar with multiple semiconductor diode lasers or VCSELs.

An embodiment of a ribbon-type MEMS phased-array will now be described with reference to FIGS. 7A and 7B. For purposes of clarity, many of the details of MEMS phased-arrays in general and ribbon-type MEMS phased-arrays in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Figure 7A:
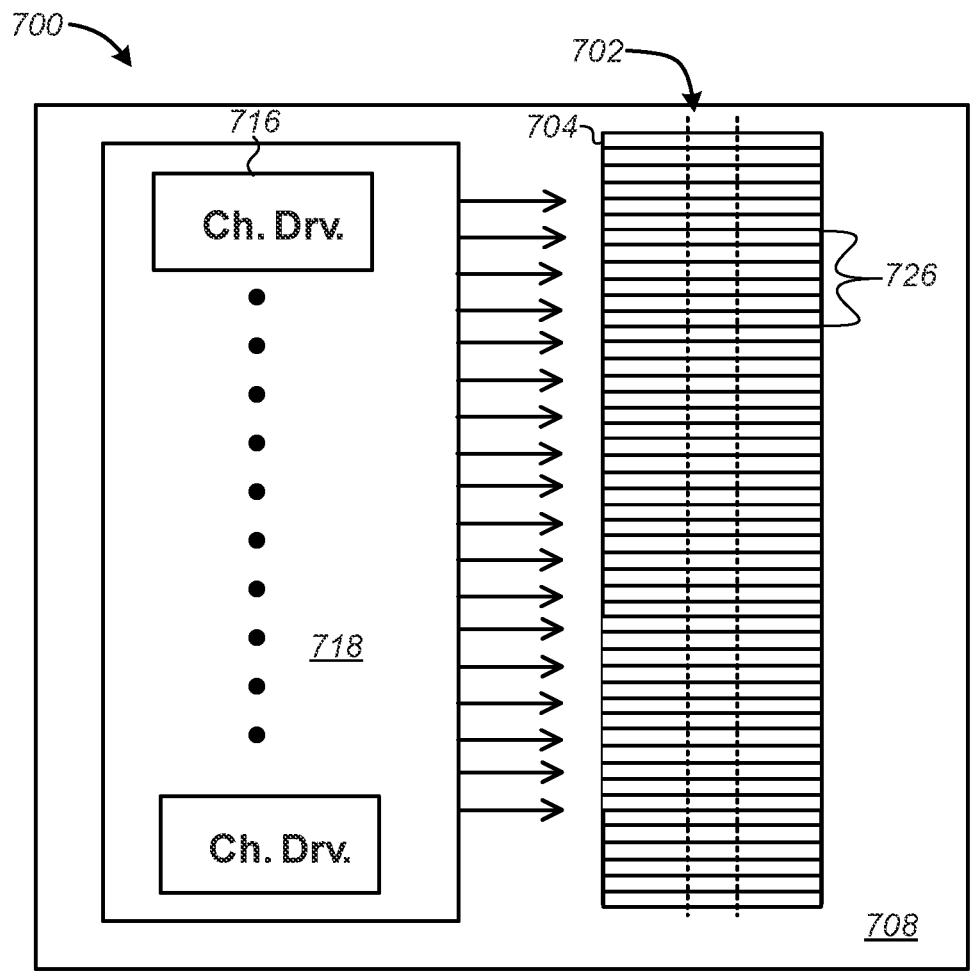
FIGS. 7A through 7C are diagrams illustrating an embodiment of a ribbon-type a MEMS phased-array suitable for use in an optical system.
Figure 7B:
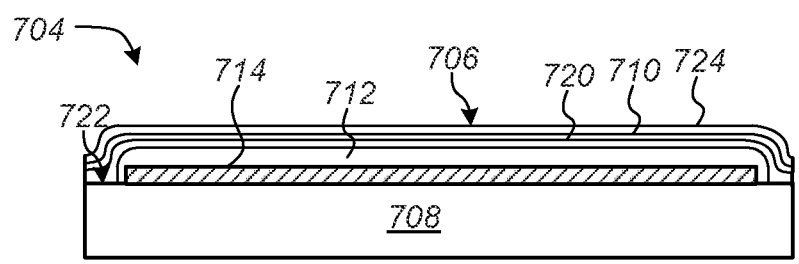

Referring to FIGS. 7A and 7B in the embodiment shown the MEMS phased-array is a one dimensional (1D) ribbon-type MEMS phased-array 700 that includes a linear array 702 composed of thousands of free-standing, addressable electrostatically actuated ribbons 704, each having a light reflective surface 706 supported over a surface of a substrate 708. Each of the ribbons 704 includes an electrode 710 and is deflectable through a gap or cavity 712 toward the substrate 708 by electrostatic forces generated when a voltage is applied between the electrode in the ribbon and a base electrode 714 formed in or on the substrate. The ribbon electrodes 710 are driven by a drive channel 716 in a driver 718, which may be integrally formed on the same substrate 708 with the linear array 702.

A schematic sectional side view of an elongated element or ribbon 704 of the MEMS phased-array 700 of FIG. 7A is shown in FIG. 7B. Referring to FIG. 7B, the ribbon 704 includes an elastic mechanical layer 720 to support the ribbon above a surface 722 of the substrate 708, a conducting layer or electrode 710 and a reflective layer 724 including the reflective surface 706 overlying the mechanical layer and conducting layer.

Generally, the mechanical layer 720 comprises a taut silicon-nitride film (SiNx), and is flexibly supported above the surface 722 of the substrate 708 by a number of posts or structures, typically also made of SiNx, at both ends of the ribbon 704. The conducting layer or electrode 710 can be formed over and in direct physical contact with the mechanical layer 720, as shown, or underneath the mechanical layer. The conducting layer or ribbon electrode 710 can include any suitable conducting or semiconducting material compatible with standard MEMS fabrication technologies. For example, the electrode 710 can include a doped polycrystalline silicon (poly) layer, or a metal layer. Alternatively, if the reflective layer 724 is metallic it may also serve as the electrode 710.

The separate, discrete reflecting layer 724, where included, can include any suitable metallic, dielectric or semiconducting material compatible with standard MEMS fabrication technologies, and capable of being patterned using standard lithographic techniques to form the reflective surface 706.

Figure 7C:
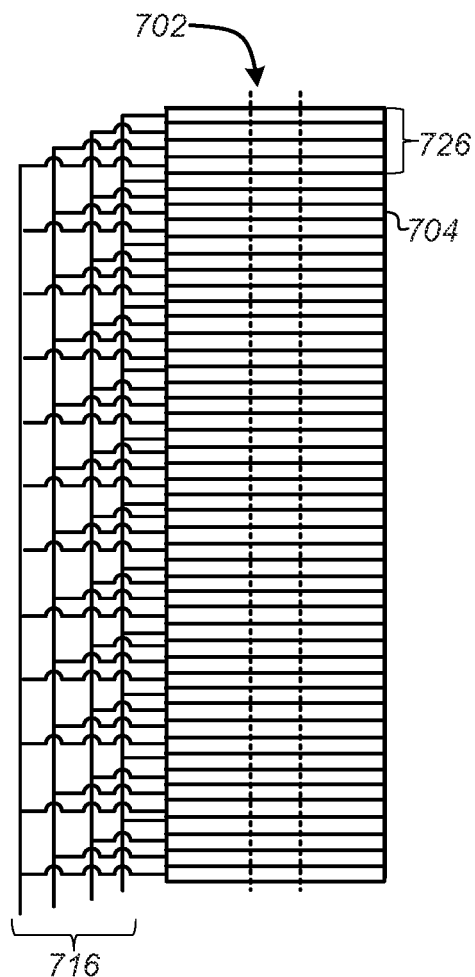

In the embodiment shown in FIG. 7C, a number of ribbons 704 in each MEMS pixel 726 are grouped or ganged together into a plurality of blaze groupings, driven by a single driver channel 716 to form a large number of MEMS pixels with a repeating blaze pattern.

Figure 8:
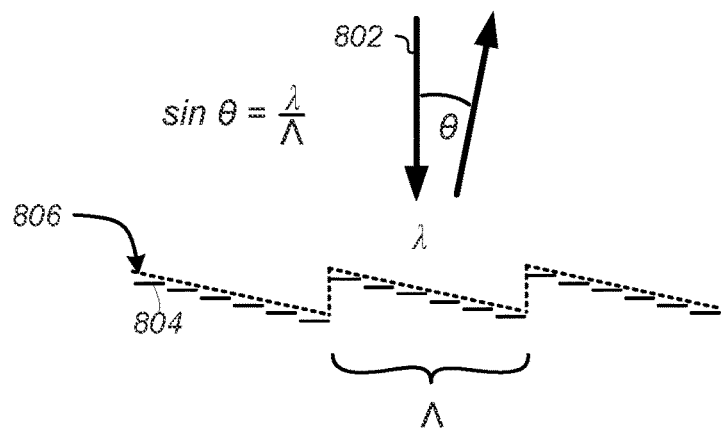
FIG. 8 is a schematic representation of pitch and amplitude of a number of individual ribbons of a MEMS phased-array operable to steer a spot or beam of light.

FIG. 8 is a schematic representation of how the pitch and amplitude of an ensemble of MEMS PHASED-ARRAY ribbons in FIGS. 7A and 7B can be adjusted to steer a beam of light. Referring to FIG. 8, in order to steer a normally incident beam 802 through a reflected steering angle θ, ribbons 804 are arranged in a "blaze" pattern 806 of pitch or period A. As the blaze pitch A is reduced, light is steered over larger angles θ. Note that the blaze period A can assume integer or non-integer values to allow continuous modulation of the steering angle θ. The largest steering angle is achieved when the blaze period comprises two ribbons.

Figure 9:
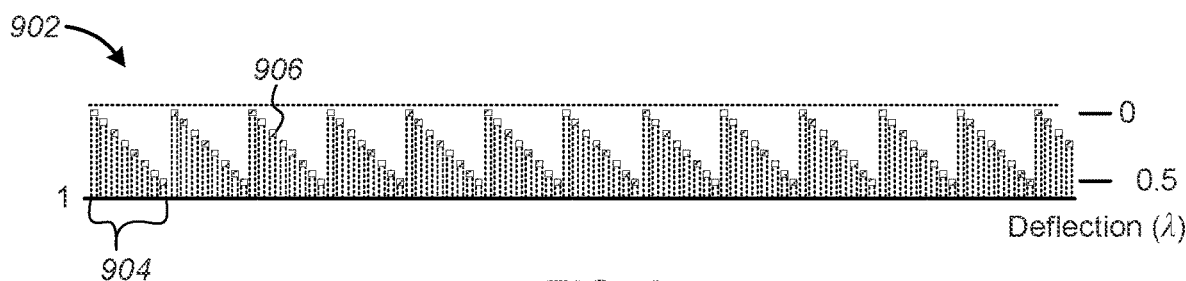
FIG. 9 is a schematic representation of pitch and amplitude of portion of a MEMS phased-array with ribbons arranged in a blaze pattern.

FIG. 9 is a schematic representation of a portion of a linear array 902 in a ribbon-type MEMS PHASED-ARRAY shown in cross-section to long axes of the ribbons. The deflection of ribbons 906 is varied to impart a monotonic phase variation along the array. Note that once the phase variation exceeds one wave (i.e. half wave deflection), the deflection pattern is continued via modulo division by the wavelength forming the blaze groupings 904. An MEMS PHASED-ARRAY with programmable MEMS elements (ribbons 906) allow light to be continuously scanned in angle, making it particularly useful in steering applications, such as LIDAR.

Figure 10:
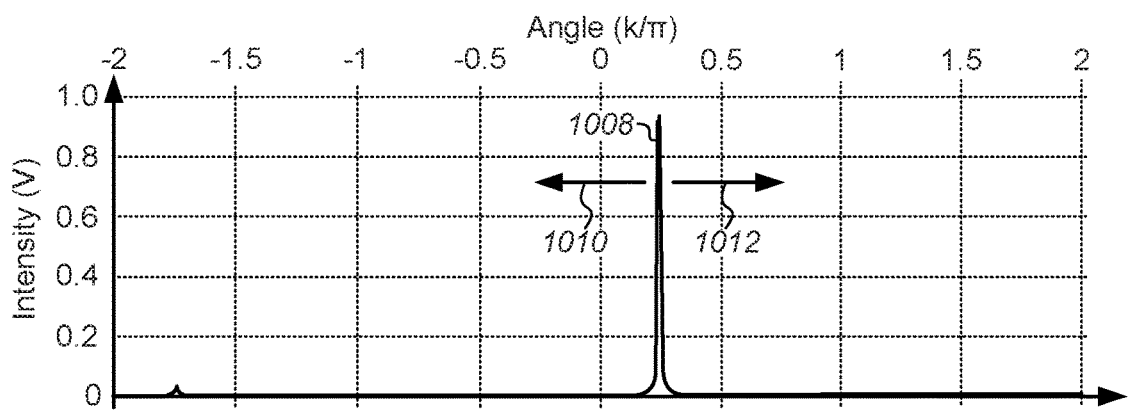
FIG. 10 is a graph of intensity versus steering angle for the MEMS phased-array represented in FIG. 9, illustrating the suitability of the MEMS phased-array for applications requiring fast beam steering and large scan angles.

FIG. 10 is a graph of intensity versus steering angle and illustrates the suitability of the ribbon-type MEMS PHASED-ARRAY represented schematically in FIG. 9 for phased-array applications. Referring to FIG. 10, it is seen that the periodic spatial pattern along ribbon-type MEMS PHASED-ARRAY shown in FIG. 9 creates a phased-array reflection, while varying the spatial period and amplitude of the pattern changes the reflected beam angle, allowing the ribbon-type MEMS PHASED-ARRAY to rapidly cycle through patterns to sweep beam across field. In particular, it is noted that as the period of the spatial pattern on the array 902 increases, i.e., as each period includes a greater number of ribbons, a maximum intensity 1008 with which light is reflected from the array 902 shifts to the left as indicated by arrow 1010. As spatial period decreases or the number of ribbons in each period reduced, the maximum intensity 1008 with which light is reflected from the array 902 shifts to the right as indicated by arrow 1012.

Figure 11:
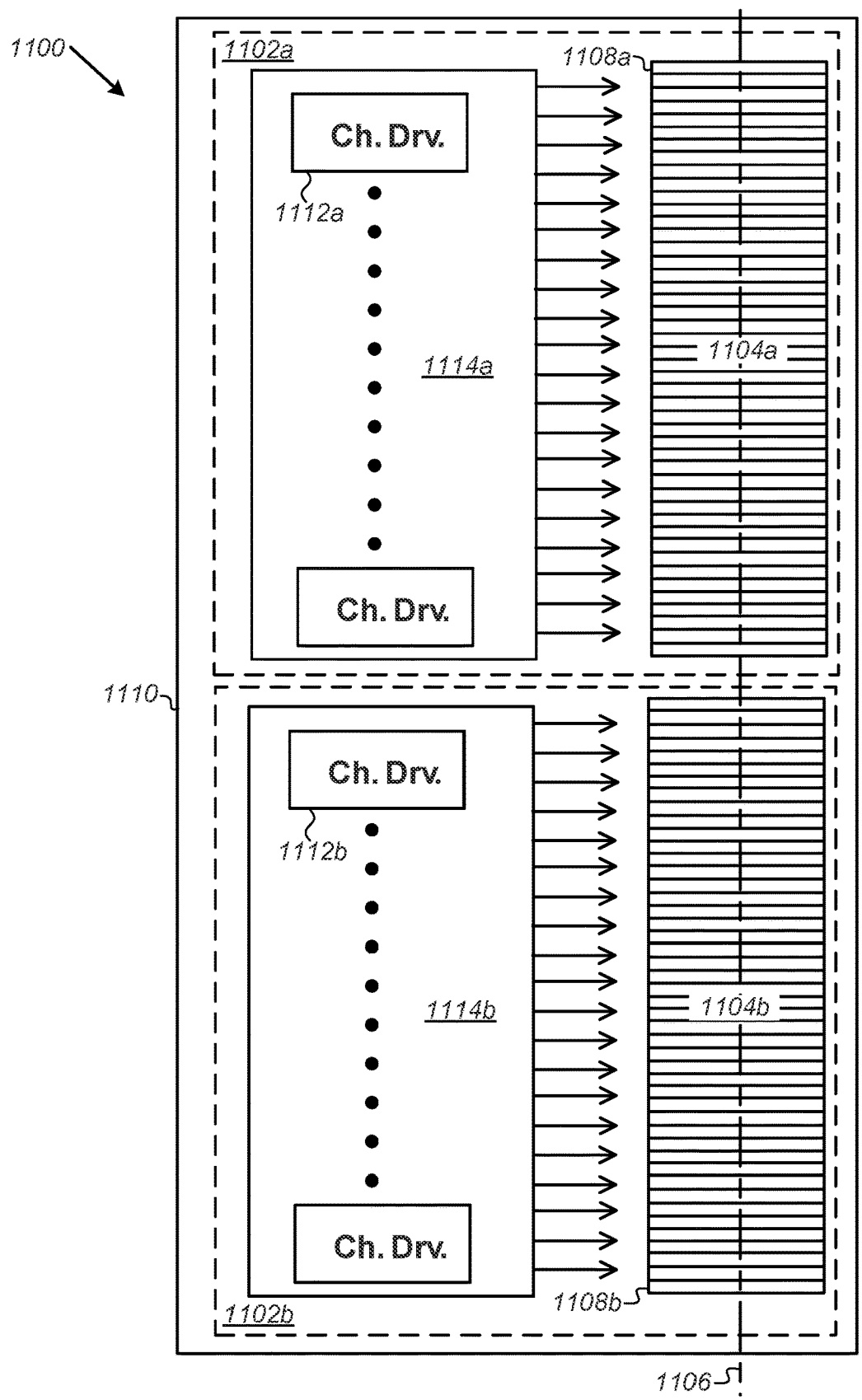
FIG. 11 is a diagram illustrating a top view of another embodiment of a ribbon-type MEMS phased-array suitable for use in an optical system including multiple ribbon-type MEMS phased-arrays stacked to increase an axial dimension parallel to a long axis of the MEMS phased-arrays.

In one embodiment, such as that shown in FIG. 11, the MEMS phased-array 1100 can include multiple ribbon-type MEMS phased-arrays 1102a, 1102b, each with a one dimensional (1D) array 1104a, 1104b, arranged in a line along a common or shared long axis 1106 and operated to increase an area over which modulated light can be scanned, and stacked to increase an axial dimension parallel to the long axis of the arrays. Referring to FIG. 11, each of the arrays 1104a, 1104b, includes hundreds or thousands of freestanding, addressable electrostatically actuated ribbons 1108a, 1108b. As with the ribbon-type MEMS phased-array 700 described above with respect to FIGS. 7A to 7C, each of the ribbons 1108a, 1108b, has a light reflective surface, includes an electrode and is deflectable through a gap or cavity toward a substrate 1110 by electrostatic forces generated when a voltage is applied between the electrode in the ribbon and a base electrode in the substrate. Each of the ribbons 1108a, 1108b, is driven by a drive channel 1112a, 1112b in a driver 1114a, 1114b, which may be integrally formed on the same substrate 1110 with the arrays 1104a, 1104b.

In some embodiments, such as that shown, each of the ribbon-type MEMS phased-arrays 1102a, 1102b, including the arrays 1104a, 1104b and drivers 1114a, 1114b, are integrally formed on a single, shared substrate 1110. Alternatively, each of the ribbon-type MEMS phased-arrays 1102a, 1102b, can be integrally formed on separate substrates, which are then packaged in a single, share integrated circuit (IC) package. In yet another alternative embodiment, each of the ribbon-type MEMS phased-arrays 1102a, 1102b, are separately packaged and then mounted to a single, shared printed circuit board (PCB).

Figure 12:
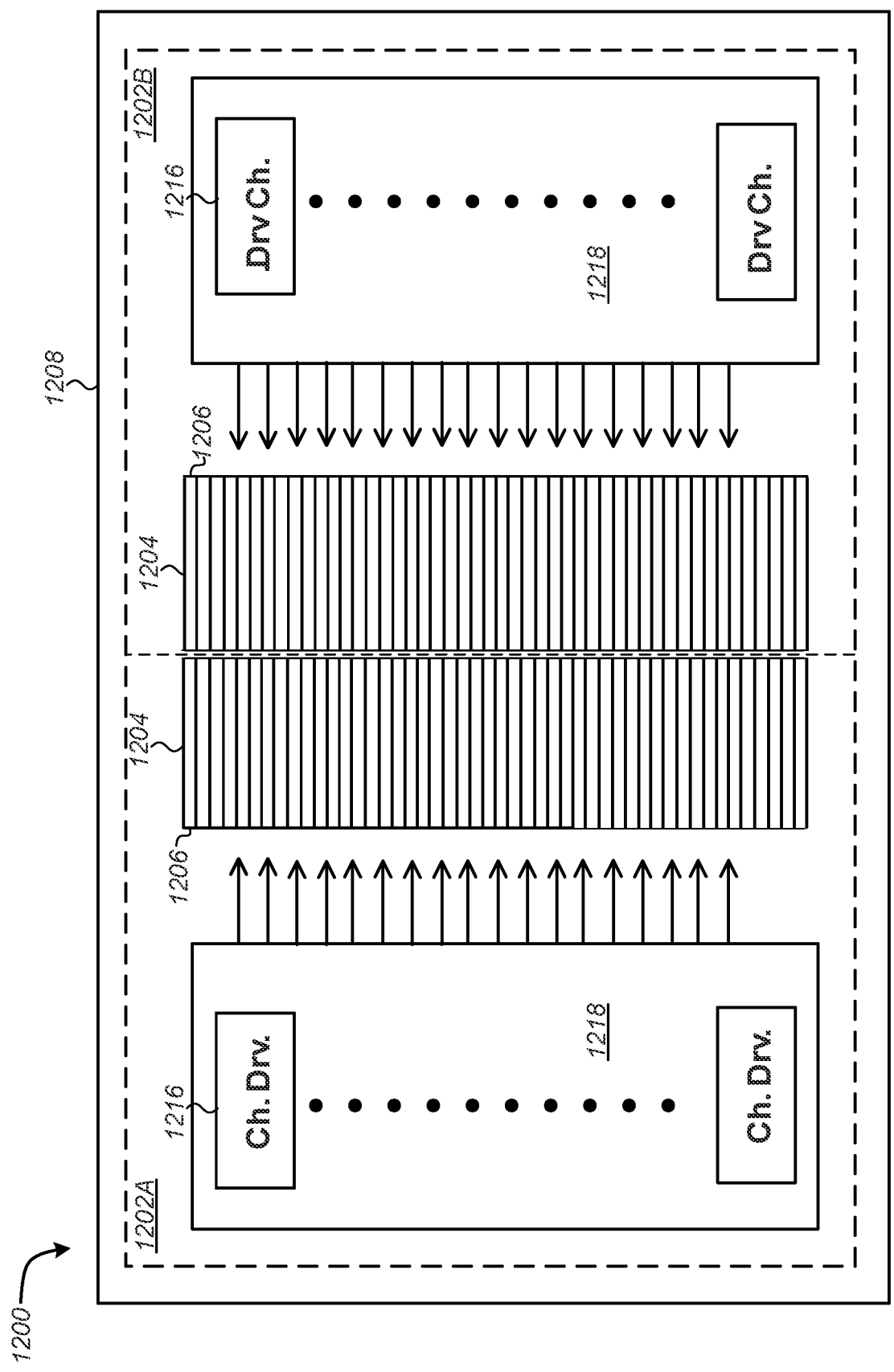
FIG. 12 is a diagram illustrating a top view of another embodiment of a ribbon-type MEMS phased-array suitable for use in an optical system including multiple ribbon-type MEMS phased-arrays arranged in parallel.

In another embodiment, shown in FIG. 12, the MEMS phased-array can include multiple ribbon-type MEMS phased-arrays or a single ribbon-type MEMS phased-array having multiple one dimensional (1D) arrays arranged and operated in parallel to increase the active aperture of the optical scanner. Increasing the functional area of the MEMS phased-array in this manner allows for simpler optics, enables an increased field of view (FOV) and system point spread resolution, as well as increased sensitivity by collecting more light in de-scan operations.

FIG. 12 is a diagram illustrating a top view of an embodiment of a MEMS phased-array 1200 including multiple ribbon-type MEMS phased-arrays 1202A and 1202B each including an array 1204 of a plurality of ribbons 1206 arranged in parallel. Generally, as in the embodiment shown the ribbon-type MEMS phased-array 1202A and 1202B are integrally formed on a shared substrate 1208, and the ribbons 1206 are driven by drive channels 1216 in a driver 1218, which may be integrally formed on the same substrate 1208 with the arrays 1204. Alternatively, in an embodiment not shown all of the multiple ribbon-type MEMS phased-arrays 1202A and 1202B can be driven by a single shared driver 1218.

As noted above, one shortcoming with previous generations of conventional MEMS devices, such as DMDs, which has kept them from being successfully used in phased-arrays for many applications, such as LiDAR, is the presence of side-lobes with respect to a main-lobe in an emission profile of light reflected from the far-field scene in response to the projected light.

Figure 13:
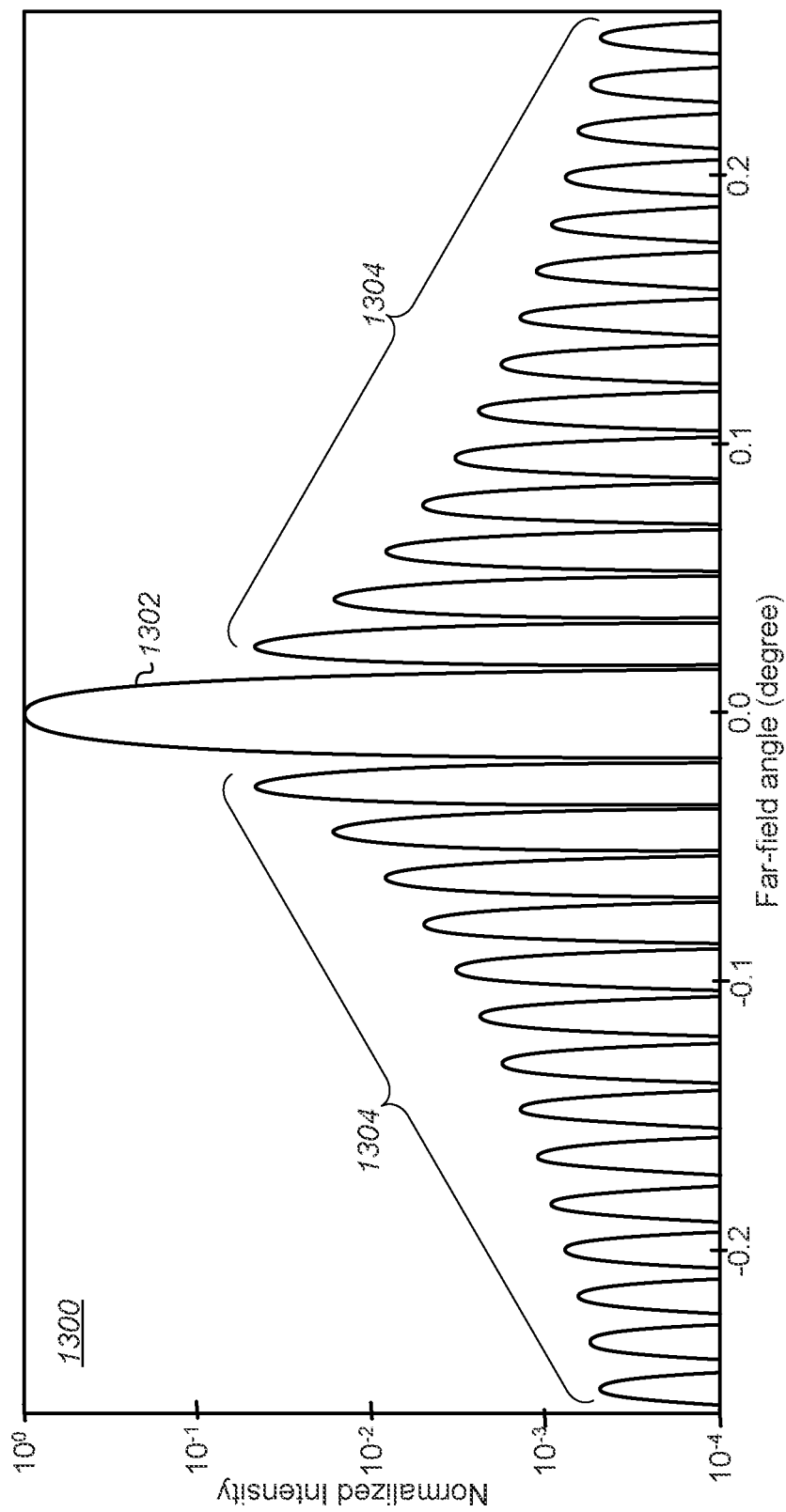
FIG. 13 is a graph of an emission profile of light reflected from the far-field scene in response to light projected from a conventional MEMS phased-array, and illustrating problems caused by side-lobes with respect to a main-lobe in a LiDAR system.

FIG. 13 is a graph of an emission profile of light reflected from the far-field scene in response to light projected from conventionally operated MEMS phased-array illustrating problems caused by side-lobes with respect to a main-lobe in a LiDAR system. A conventionally operated MEMS phased-array illuminated with a substantially uniform illumination has a response in the far-field characterized by a sinc function (sin x/x) leading to a main-lobe and large side-lobes, resulting in greatly reduced contrast in the far-field response. FIG. 13 illustrates far-field response from light projected from a uniformly illuminated MEMS phased-array. Referring to FIG. 13, it noted that the sinc function for the emission profile 1300 has been normalized with a very thin main-lobe 1302, but with >20 side-lobes 1304 above 40 dB. For LiDAR applications, the reflection response from a dark, scattering target at the steered angle may be 10000 times weaker than a specularly reflective surface elsewhere within the FOV, such as a retroreflector on a stop sign on the side of the road. This difference can cause the reflected response of a sidelobe to overwhelm the scattered response of a main lobe target or cause multiple signals that obfuscate the actual positions of objects. For this reason, 40 dB is a better cut off for LiDAR resolution rather than more common conventions such as the first sinc null of the Rayleigh criterion, and there is a desire to eliminate sidelobes that may appear negligible on a linear scale.

It has been found that by illuminating the MEMS phased-array with a non-uniform illumination, and preferably illuminating the MEMS phased-array with a light-beam having a Gaussian-profile, the number and power of side-lobes can be substantially reduced, resulting in higher contrast optical systems, particularly suitable for use in LiDAR systems. By Gaussian-profile it is meant a laser beam profile having the amplitude profile defined within one axis by the equation $\exp(-x^2/w^2)$, where w is a characteristic beam width. A Gaussian beam is commonly understood to be the fundamental transverse electromagnetic mode of a laser cavity. The far field response of a Gaussian profile is a Gaussian profile, meaning that the side lobes of the uniform illumination are suppressed so long as the Gaussian laser beam is properly confined. Good confinement is typically taken as the beam radius w is less than one third of the device aperture. As the Gaussian width becomes larger than the device aperture, the illumination profile starts to look like the uniform case and side lobes will begin to appear. Further investigation of the effect of Gaussian width on sidelobe power is discussed later.

FIGS. 14A and 14B are optic diagrams illustrating illumination optics 1400 and light paths for illuminating a MEMS phased-array with a light-beam having a Gaussian-profile according to different embodiments of the present disclosure.

Referring to FIG. 14A, in a first embodiment wherein a light source includes a laser diode 1402 generating a substantially collimated and uniform light-beam 1404 the illumination optics 1400 can include a number of beam expanding elements or a beam expander 1406 to reshape the light-beam, and a focusing lens 1408 to substantially illuminate the MEMS phased-array 1410 with a substantially non-uniform light-beam having Gaussian-profile.

In another embodiment, shown in FIG. 14B, wherein the light source includes a fiber laser 1412, already having a substantially Gaussian output the illumination optics 1400 can include a focusing lens 1408 to substantially illuminate the MEMS phased-array 1410 with a substantially non-uniform light-beam having Gaussian-profile by preserving the Gaussian output of the fiber laser 1412.

In other embodiments in which the MEMS phased-array is a ribbon MEMS phased-array, the side-lobes in the far-field response can be minimized by offsetting a deflection of at least some of the ribbons in a blaze group or pixel from a blaze pattern of the blaze grouping to compensate for wavefront errors in the light-beam to minimize side-lobes. It will be understood that this offset approach can be used either in place of or in addition to the Gaussian illumination described above to further minimize or substantially eliminate the side-lobes.

Figure 15:
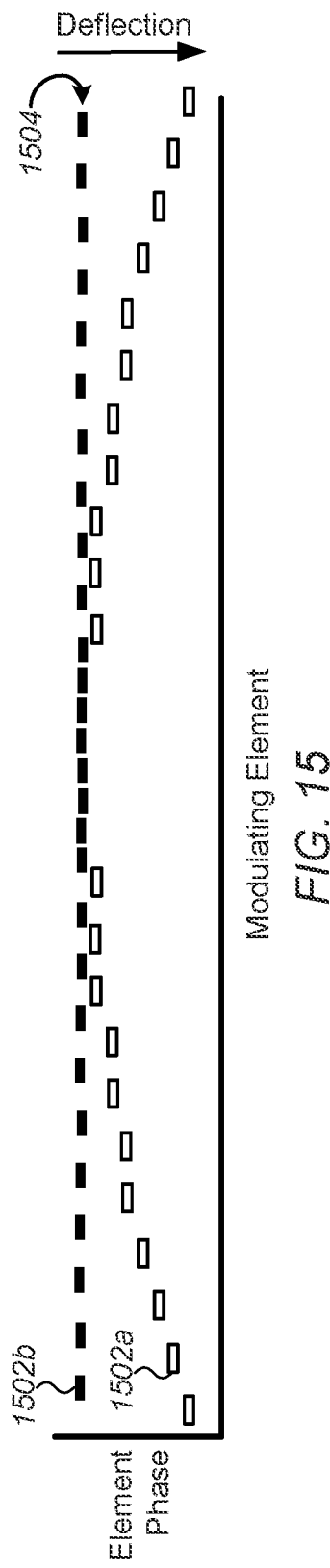
FIG. 15 is a schematic representation of a plurality of ribbons of a MEMS phased-array illustrating an offset of at least some of the ribbons from a blaze pattern to minimize side-lobes in an emission profile of light reflected from the far-field scene.

FIG. 15 is a schematic representation of a plurality of ribbons of a MEMS phased-array in a blaze group or pixel illustrating an offset of at least some of the ribbons from a blaze pattern to minimize side-lobes in an emission profile of light reflected from the far-field scene. Referring to FIG. 15, the horizontal axis illustrates the position of a number of modulating elements or ribbons 1502a, 1502b within a grouping or pixel, while a vertical axis indicates an amount by which a number of first ribbons 1502a is offset from a blaze profile 1504 defined by a number of second ribbons 1502b when deflected in the direction indicated. By amount of offset it is meant an amount phase shift of the light incident on each ribbon and is a function of a wavelength of light incident on the MEMS phased-array.

Generally, an iterative calibration can be used to find the amount of offset or a compensation profile for a single position (blaze profile), and apply that to all blaze profiles. Alternatively, an iterative calibration can be used to find a compensation profile for each blaze profile or position.

Figure 16:
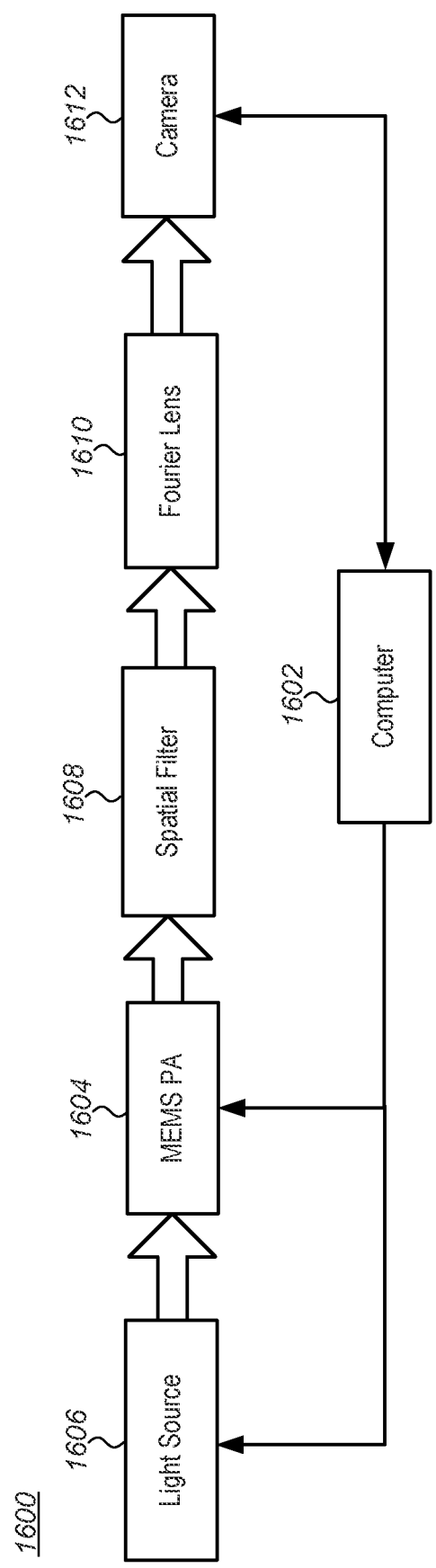
FIG. 16 is a block diagram illustrating an optical system including a computer for calibrating a MEMS phased-array to minimize side-lobes.

FIG. 16 is a block diagram illustrating an optical system 1600 including a computer 1602 to find offsets for a compensation profile to calibrate a MEMS phased-array (MEMS PA 1604) to minimize side-lobes. Referring to FIG. 16 the optical system 1600 further includes a light source 1606, such as a diode or fiber laser, optically coupled to the MEMS phased-array 1604, and a spatial filter 1608 and Fourier lens 1610 through which the MEMS phased-array images reflected and modulated light onto a camera 1612. Although not shown, in this figure it will be understood that the light source 1606 can be optically coupled to the MEMS phased-array 1604 using illumination optics operable to illuminate the MEMS phased-array with a light-beam having a Gaussian-profile, as described above with reference to FIGS. 14A and 14B.

The computer 1602 is further electrically coupled to the light source 1606, the MEMS phased-array 1604, and to the camera 1612, to control the light source and MEMS phased-array to generate the image projected onto the camera, and to receive that image as recorded by the camera for comparison with an ideal image and determine the offsets for a compensation profile using an optimization algorithm executed by the computer. Example of optimization algorithms can include standard techniques to analyze for aberrations that can be corrected using phase, such as Zernike polynomials or similar lens aberration, an optimization algorithm such as Newton's gradient descent, or a phase retrieval algorithm, such as Gerchberg-Saxton.

Figure 17:
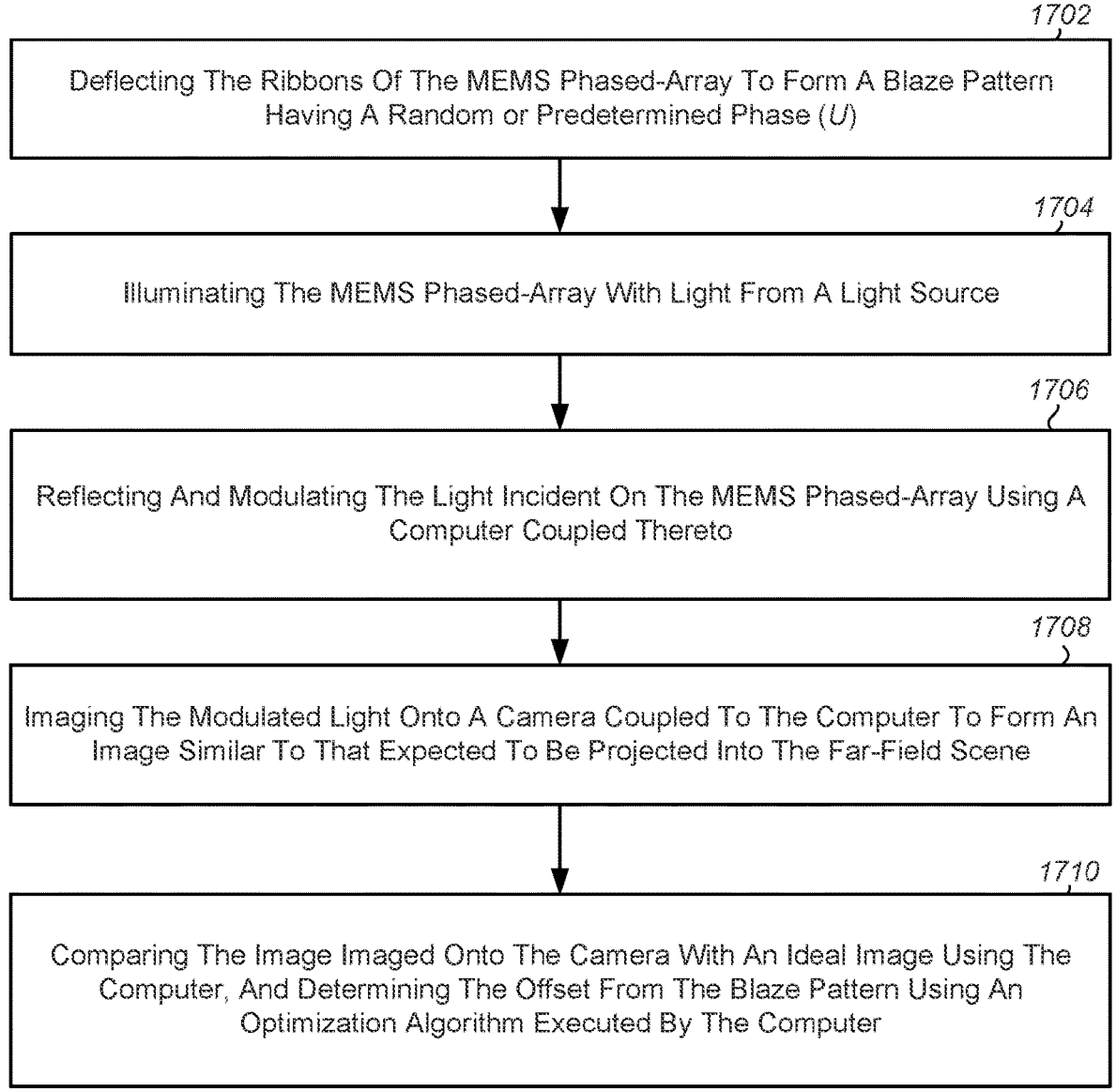
FIG. 17 is a flowchart an embodiment of a method for phase calibration for optimal far field response.

Methods for determining an offset phase calibration for optimal, high-contrast far field response will now be described in greater detail with reference to FIG. 17. FIG. 17 is a flowchart an embodiment of a first method for determining an offset phase calibration for optimal far field response through direct optimization. Referring to FIG. 17, the method begins with deflecting the ribbons of the MEMS phased-array to form a blaze pattern having a phase (u) (1702), and illuminating the MEMS phased-array with light from a light source (1704). Next, the light incident on the MEMS phased-array is reflected and modulated using a computer coupled thereto and operable to control deflection of the plurality of ribbons (1706). The modulated light is then imaged onto a camera coupled to the computer to form an image similar to that expected to be projected into the far-field scene (1708). Generally, as shown in FIG. 16, the modulated light imaged onto the camera is passed through a spatial filter and Fourier lens. The image imaged onto the camera is then with an ideal image using the computer, and the offset from the blaze pattern determined using an optimization algorithm executed by the computer (1710).

In one embodiment, comparing the image with the an ideal image includes (i) measuring an intensity (U) of a Fourier profile of the image on camera; (ii) comparing the measured intensity (U) to a desired intensity (UT) of the ideal image; (iii) calculating an error value between the measured intensity (U) to a desired intensity (UT); (iv) updating the blaze pattern using the offset determined using the optimization algorithm; and (v) repeating the above steps until the error value is below a desired amount.

In another embodiment, comparing the image with the ideal image includes, after measuring an intensity (U) of a Fourier profile of the image on camera, (i) calculating a hologram (UH) that corresponds to a desired intensity (UT) of the ideal image using a phase retrieval algorithm; and (ii) updating the blaze pattern using the offset determined using the hologram (UH).

Generally, the method of calibration can be repeated for a number of times with different blaze patterns, each corresponding to a different steering location in the far-field scene.

Figure 18A:
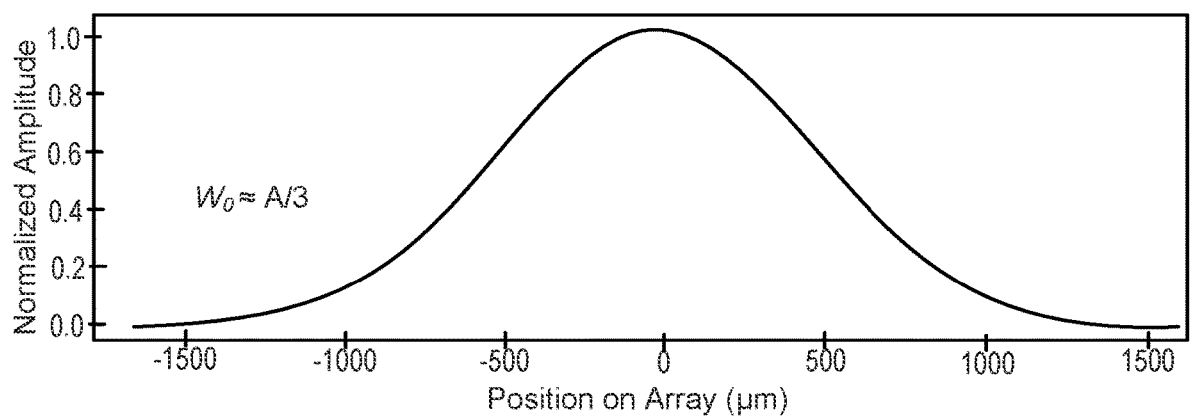
FIGS. 18A and 18B are graphs of illumination on a MEMS phased-array and a far-field response, illustrating the impact of an aperture of an optical system including the MEMS phased-array on side-lobes in the far-field response, according to an embodiment.
Figure 18B:
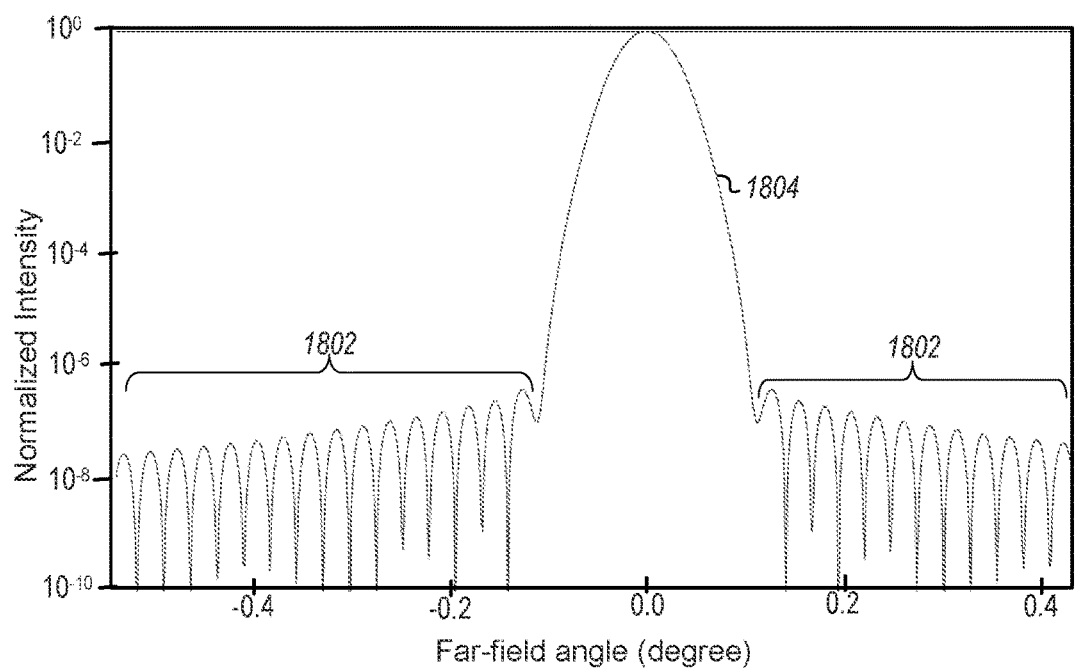

It has further been found that for a MEMS phased-array illuminated by a light-beam having a Gaussian-profile, increasing an aperture of the optical system relative to a radius or waist of the light-beam will further minimize or eliminate side-lobes in a far-field response. FIGS. 18A and 18B are graphs of illumination on a MEMS phased-array and a far-field response, illustrating the impact of an aperture of an optical system including the MEMS phased-array on side-lobes in the far-field response, according to a first embodiment. For an optical system including a ribbon MEMS phased-array the aperture can be increased by increasing a number of individual modulators or ribbons in the array or by increasing the number of MEMS phased-array in a ganged manner as shown in FIG. 11. Referring to FIG. 18A it is seen that the illumination on the MEMS phased-array has a waist ($W_0$) approximately equal to one third of the aperture (A/3) for the system. Referring to FIG. 18B it is seen that this aperture results in substantially minimized side-lobes 1802 having power less than $10^{-6}$ or 0.0001% as compared to the normalized power of the main lobe 1804.

Figure 19A:
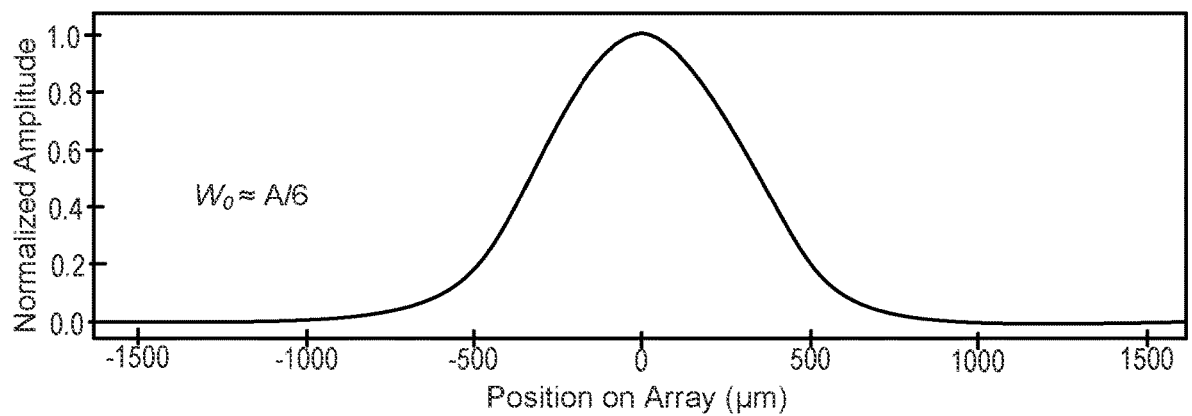
FIGS. 19A and 19B are graphs of illumination on a MEMS phased-array and a far-field response, illustrating the impact of an aperture of an optical system including the MEMS phased-array on side-lobes in the far-field response, according to another embodiment.
Figure 19B:
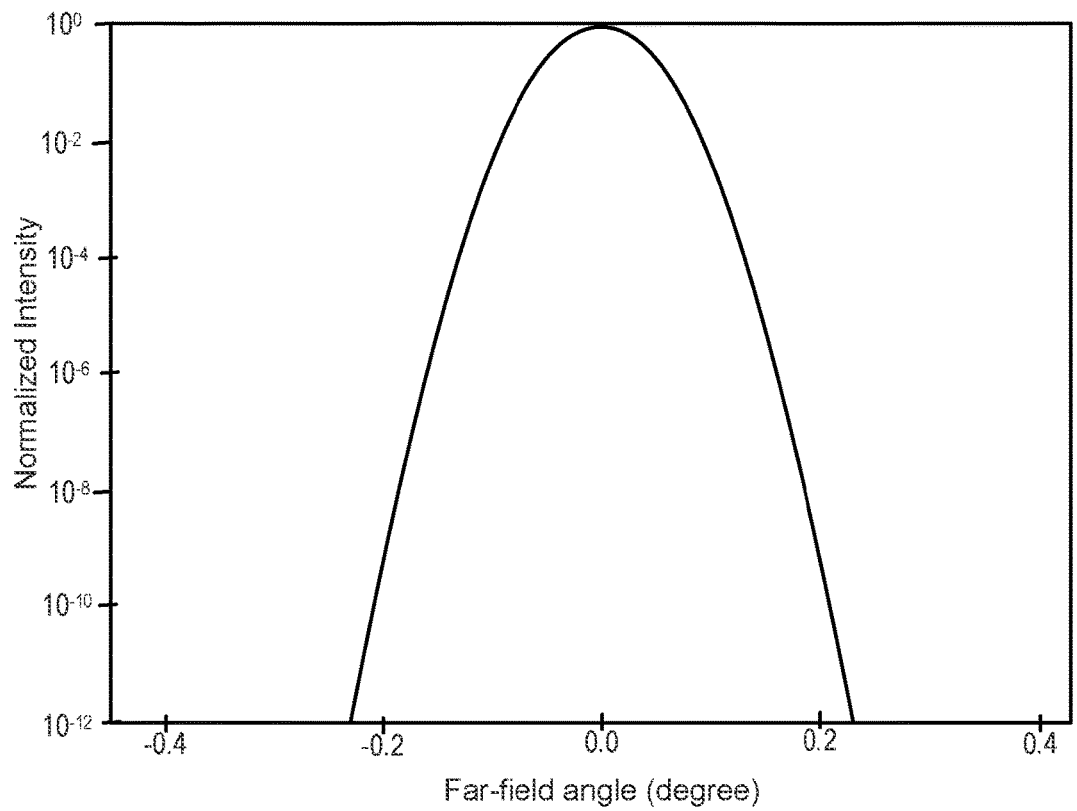

FIGS. 19A and 19B are graphs of illumination on a MEMS phased-array and a far-field response, illustrating the impact of an aperture on side-lobes according to another embodiment. Referring to FIG. 19A it is seen that the illumination on the MEMS phased-array has a waist ($W_0$) approximately equal to one sixth of the aperture (A/6) for the system. Referring to FIG. 19B it is seen that this aperture results in side-lobes being substantially eliminated.

Figure 20:
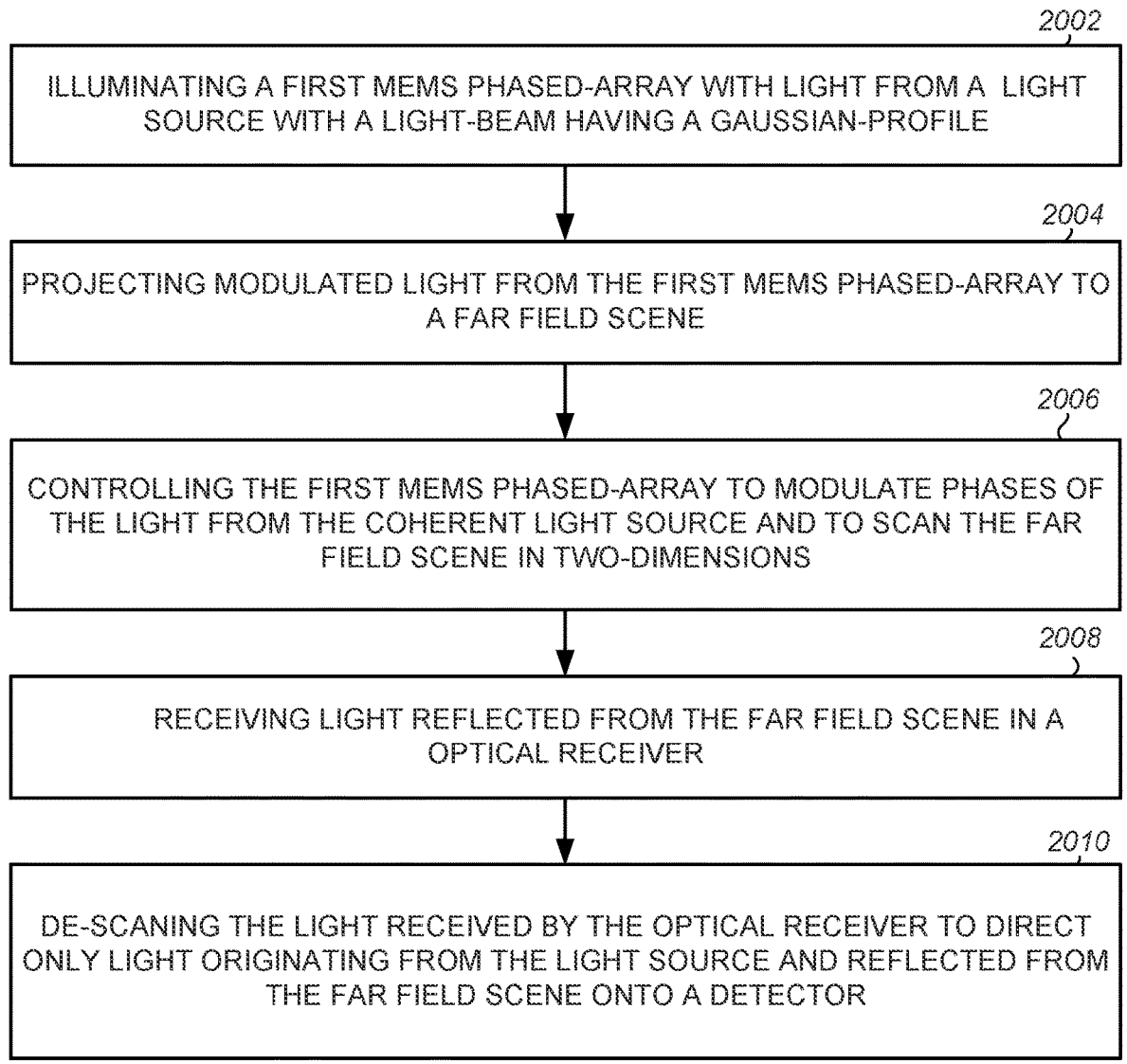
FIG. 20 is a flow chart of a method for operating an optical scanner including a MEMS phased-array for use in a light detection and ranging (LiDAR) system.

A method of operating an optical scanner including a first microelectromechanical system (MEMS) phased-array for use in a light detection and ranging (LiDAR) system will now be described with reference to the flow chart of FIG. 20. Referring to FIG. 20 the method begins with illuminating a first MEMS phased-array with light from a light source with a light-beam having a Gaussian-profile to minimize side-lobes with respect to a main-lobe in an emission profile of light reflected from the far-field scene in response to the projected light (2002). The first MEMS phased-array is controlled to modulate phases of the light from the coherent light source and project the modulated light from the first MEMS phased-array to a far field scene (2004), and the first MEMS phased-array is further operated or controlled to scan the far field scene (2006). Generally, the first MEMS phased-array is adapted or configured to scan the far field scene in two-dimensions (2D), including an angular dimension and an axial dimension parallel to a long axis of the first MEMS phased-array. In some embodiments, the step of operating or controlling the first MEMS phased-array to scan the far field scene, step 2006, includes operating or controlling the first MEMS phased-array so that deflection of at least some of the plurality of ribbons in a blaze grouping or pixel is offset from a blaze pattern to compensate for non-uniformities in the light-beam to further minimize side-lobes. Methods for determining the ribbons offset and an amount of the offset are described in greater detail below. Next, light reflected from the far field scene is received in an optical receiver of the LiDAR system (2008), and de-scanned by directing only light originating from the light source and reflected from the far field scene onto a detector (2010). In one embodiment, described above with reference to FIG. 6B, the receiving optics include a second MEMS phased-array, and the step of de-scanning, step 2006, includes controlling the second MEMS phased-array to de-scan the received light by directing substantially only light originating from the coherent light source and reflected from the far field scene onto a detector while rejecting background light. In another embodiment, shown in FIG. 6C, the MEMS phased-array is time multiplexed and the step of de-scanning, step 2006, includes controlling the second MEMS phased-array at a second time to de-scan light received from the far-field scene by directing light originating from the number of the MEMS phased-arrays and reflected from the far-field scene field scene onto the detector and rejecting background light.

Thus, embodiments of high contrast MEMS phased-arrays and systems, such as LIDAR systems, and methods for operating the same to mitigate or eliminate side lobes and increase contrast have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:
1. An optical system comprising:
   a light source;
   illumination optics operable to receive light from the light source; and a number of microelectromechanical system (MEMS) phased-arrays operable to receive a light-beam from the illumination optics, and to reflect the received light-beam to project light project light onto a far-field scene and to steer an area of illumination over the far-field scene by modulating phases of at least some light of the light-beam received from the illumination optics, wherein the illumination optics is operable to illuminate the number of the MEMS phased-arrays with a light-beam having a Gaussian-profile to minimize side-lobes with respect to a main-lobe in an emission profile of light reflected from the far-field scene in response to the projected light.

2. The system of claim 1 wherein the light source comprises a number of laser diodes, and wherein the illumination optics include a collimating lens to collimate light from the number of laser diodes, and a beam expander to receive the light from the collimating lens and form the light-beam having a Gaussian-profile.

3. The system of claim 1 wherein the light source comprises a fiber laser operable to output a light having a Gaussian-profile, and wherein the illumination optics include a focusing lens to shape the light from the fiber laser into the light-beam to illuminate the number of the MEMS phased-arrays while maintaining the Gaussian-profile of the light output from the fiber laser.

4. The system of claim 1 wherein each of the number of the MEMS phased-arrays comprise a ribbon MEMS phased-array including a plurality of ribbons suspended in parallel rows over a substrate, each ribbon having a light reflective surface and a length perpendicular to a long axis of the ribbon MEMS phased-array, and wherein the ribbon MEMS phased-array is operable to deflect at least a number of the plurality of ribbons towards the substrate to modulate phases of light reflected therefrom to scan the far-field scene in an angular dimension and an axial dimension parallel to the long axis of the phased-array.

5. The system of claim 4 the plurality of ribbons are ganged together into a plurality of blaze groupings, and wherein deflection of a number of the plurality of ribbons in at least one of the plurality of blaze groupings is offset from a blaze pattern of the blaze grouping to compensate for wavefront errors in the light-beam to further minimize side-lobes.

6. The system of claim 5 wherein a number of the plurality of ribbons in each of the number of MEMS phased-arrays and a number of the plurality of blaze groupings are selected to provide an aperture for the optical system 3 to 6 times larger than a waist of the light-beam.

7. The system of claim 1 wherein the system is a (LiDAR) system, and wherein the MEMS phased-array is operable to:
at a first time modulate and reflect the light-beam to project light onto the far-field scene; and
at a second time to de-scan light received from the far-field scene by directing light originating from the number of the MEMS phased-arrays and reflected from the far-field scene onto a detector and rejecting background light.

8. The system of claim 7 wherein the system is a (LiDAR) system further including a second number of MEMS phased-arrays operable to receive light from the far-field scene and to de-scan light received from the far-field scene by directing light originating from the number of the MEMS phased-arrays and reflected from the far-field scene onto a detector while rejecting background light.

9. An optical system comprising:
a light source;
illumination optics operable to receive light from the light source; and
a microelectromechanical system (MEMS) phased-array including a plurality of ribbons suspended in parallel rows over a substrate, each ribbon having a light reflective surface and a length perpendicular to a long axis of the MEMS phased-array, the MEMS phased-array operable to receive a light-beam from the illumination optics and to deflect at least a number of the plurality of ribbons towards the substrate to modulate phases of light reflected therefrom to project light onto a far-field scene in two-dimensions, the two-dimensions including a first direction over which the light is dispersed to form a swath of illumination and a second dimension over which the swath is steered, wherein the plurality of ribbons are ganged together into a plurality of blaze groupings, and wherein deflection of a number of the plurality of ribbons in at least one of the plurality of blaze groupings is offset from a blaze pattern of the blaze grouping to compensate for non-uniformities in the light-beam to minimize side-lobes with respect to a main-lobe in an emission profile of light reflected from the far-field scene in response to the projected light.

10. The system of claim 9 wherein a number of the plurality of ribbons in the MEMS phased-array and a number of the plurality of blaze groupings are selected to provide an aperture for the optical system 3 to 6 times larger than a waist of the light-beam.

11. The system of claim 9 wherein the system is a (LiDAR) system further including an optical receiver to receive light including at least some light from the MEMS phased-array reflected from the far-field scene and to direct at least some of the received light onto a detector.

12. The system of claim 11 wherein the optical receiver further including a second MEMS phased-array to receive light from the far-field scene and to direct at least some of the received light onto the detector.

13. The system of claim 9 wherein the light source comprises a number of laser diodes, and wherein the illumination optics include a collimating lens to collimate light from the number of laser diodes, and a beam expander to receive the light from the collimating lens and form a light-beam having a Gaussian-profile.

14. The system of claim 9 wherein the light source comprises a fiber laser operable to output a light having a Gaussian-profile, and wherein the illumination optics include a focusing lens to shape the light from the fiber laser into the light-beam to illuminate the MEMS phased-array while maintaining the Gaussian-profile of the light output from the fiber laser.

15. A method of operating an optical system comprising:
illuminating with a light-beam a microelectromechanical system (MEMS) phased-array including a plurality of ribbons suspended in parallel rows over a substrate, each ribbon having a light reflective surface and a length perpendicular to a long axis of the MEMS phased-array;
ganging the plurality of ribbons together into a plurality of blaze groupings; and
deflecting at least a number of the plurality of ribbons towards the substrate to modulate phases of light reflected therefrom to project light onto a far-field scene in two-dimensions, the two-dimensions including a first direction over which the light is dispersed to form a swath of illumination and a second dimension over which the swath is steered, wherein deflection of a number of the plurality of ribbons in at least one of the plurality of blaze groupings is offset from a blaze pattern of the blaze grouping to compensate for non-uniformities in the light-beam to minimize side-lobes with respect to a main-lobe in an emission profile of light reflected from the far-field scene in response to the projected light.

16. The method of claim 15 further comprising an initial calibration to determine the offset from the blaze pattern to provide a high-contrast far field response at a desired steering angle, wherein the calibration comprises:

deflecting at least a number of the plurality of ribbons to form a blaze pattern having a phase (u);

illuminating the MEMS phased-array with light from a light source;

reflecting and modulating light incident on the MEMS phased-array using a computer coupled thereto and operable to control deflection of the plurality of ribbons;

imaging the modulated light onto a camera coupled to the computer to form an image similar to that expected to be projected into the far-field scene; and comparing the image with an ideal image using the computer, and determining the offset from the blaze pattern using an optimization algorithm executed by the computer.

17. The method of claim 16 wherein:

imaging the modulated light onto camera comprises passing the light through a spatial filter and Fourier lens; and comparing the image with the ideal image comprises:

measuring intensity (U) of a Fourier profile of the image on camera;

comparing the measured intensity (U) to a desired intensity ($U_T$) of the ideal image;

calculating an error value between the measured intensity (U) to a desired intensity ($U_T$);

updating the blaze pattern using the offset determined using the optimization algorithm; and repeating the above steps until the error value is below a desired amount.

18. The method of claim 17 wherein the calibration is repeated for a number of different blaze patterns, each corresponding to a different steering location in the far-field scene.

19. The method of claim 16 wherein:

imaging the modulated light onto camera comprises passing the light through a spatial filter and Fourier lens; and comparing the image with the ideal image comprises:

measuring intensity (U) of a Fourier profile of the image on camera;

calculating a hologram ($U_H$) that corresponds to a desired intensity ($U_T$) of the ideal image using a phase retrieval algorithm; and updating the blaze pattern using the offset determined using the hologram ($U_H$).

20. The method of claim 19 wherein the calibration is repeated for a number of different blaze patterns, each corresponding to a different steering location in the far-field scene.

* * * * *